United States Patent
Sharma et al.

(10) Patent No.: US 10,592,397 B2
(45) Date of Patent: Mar. 17, 2020

(54) REPRESENTING A TEST EXECUTION OF A SOFTWARE APPLICATION USING EXTENDED REALITY

(71) Applicant: Accenture Global Solutions Limited, Dublin (IE)

(72) Inventors: Vibhu Saujanya Sharma, Bangalore (IN); Rohit Mehra, Delhi (IN); Sanjay Podder, Thane (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 16/113,595

(22) Filed: Aug. 27, 2018

(65) Prior Publication Data

US 2019/0278697 A1    Sep. 12, 2019

(30) Foreign Application Priority Data

Feb. 16, 2018  (IN) .............................. 201841006007

(51) Int. Cl.
*G06F 9/44* (2018.01)
*G06F 11/36* (2006.01)
*G06F 8/75* (2018.01)

(52) U.S. Cl.
CPC ............ *G06F 11/3664* (2013.01); *G06F 8/75* (2013.01); *G06F 11/3684* (2013.01); *G06F 11/3688* (2013.01)

(58) Field of Classification Search
CPC ............ G06F 11/3664; G06F 11/3668; G06F 11/3672; G06F 11/3688
USPC .................................. 717/124–130, 136–141
See application file for complete search history.

(56) References Cited

U.S. PATENT DOCUMENTS

| | | | | |
|---|---|---|---|---|
| 6,186,677 B1* | 2/2001 | Angel | ................. | G06F 11/3624 714/35 |
| 6,192,511 B1* | 2/2001 | Johnston | ............. | G06F 11/3664 702/182 |
| 6,263,491 B1* | 7/2001 | Hunt | ....................... | G06F 9/465 714/E11.209 |
| 6,330,556 B1* | 12/2001 | Chilimbi | ............. | G06F 12/0802 |
| 7,192,511 B2* | 3/2007 | Bonnardel | ................ | C25C 3/20 205/336 |

(Continued)

OTHER PUBLICATIONS

Tikir et al, "Efficient Instrumentation for Code Coverage Testing", ACM, pp. 86-96 (Year: 2002).*

(Continued)

*Primary Examiner* — Anil Khatri
(74) *Attorney, Agent, or Firm* — Harrity & Harrity, LLP

(57) ABSTRACT

A device may instrument a codebase associated with a software application. The device may execute a test on the instrumented codebase as the instrumented codebase executes, wherein the instrumented codebase generates test data based on the test being executed. The device may generate, based on the test data, a live graphical model of the codebase from a composite graphical model of the codebase, wherein the composite graphical model includes historical information, associated with the codebase, mapped to a graphical model of the codebase. The device may generate an extended reality rendered view of the live graphical model. The device may provide, to an extended reality device, the extended reality rendered view of the live graphical model for display by the extended reality device.

20 Claims, 13 Drawing Sheets

(56) References Cited

U.S. PATENT DOCUMENTS

| | | | | |
|---|---|---|---|---|
| 7,231,606 | B2* | 6/2007 | Miller | H04L 43/50 |
| | | | | 702/186 |
| 7,293,259 | B1* | 11/2007 | Dmitriev | G06F 11/3466 |
| | | | | 714/E11.207 |
| 7,401,324 | B1* | 7/2008 | Dmitriev | G06F 8/443 |
| | | | | 717/130 |
| 7,493,630 | B2* | 2/2009 | Hunt | G06F 9/465 |
| | | | | 719/330 |
| 7,549,144 | B2* | 6/2009 | Jubran | G06F 8/20 |
| | | | | 717/124 |
| 7,735,066 | B1* | 6/2010 | Myers | G06F 11/3612 |
| | | | | 717/125 |
| 7,840,849 | B2* | 11/2010 | O'Callahan | G06F 11/3636 |
| | | | | 714/37 |
| 7,926,043 | B2* | 4/2011 | Vaswani | G06F 11/3466 |
| | | | | 717/130 |
| 7,962,901 | B2* | 6/2011 | McCamant | G06F 11/3612 |
| | | | | 703/22 |
| 8,098,888 | B1* | 1/2012 | Mummareddy | G06K 9/00778 |
| | | | | 382/103 |
| 8,448,155 | B2* | 5/2013 | Bordelon | G06F 8/4452 |
| | | | | 717/109 |
| 8,694,958 | B1* | 4/2014 | Potter | G06F 8/35 |
| | | | | 717/104 |
| 8,707,264 | B2* | 4/2014 | Hossain | G06F 11/3672 |
| | | | | 717/124 |
| 8,719,766 | B1* | 5/2014 | Walker | G06F 8/71 |
| | | | | 717/100 |
| 8,881,116 | B2* | 11/2014 | Mulat | G06F 11/3608 |
| | | | | 717/126 |
| 8,924,938 | B2* | 12/2014 | Chang | G06F 11/3688 |
| | | | | 717/126 |
| 8,997,058 | B2* | 3/2015 | Bohnet | G06F 11/3612 |
| | | | | 717/128 |
| 9,256,512 | B1* | 2/2016 | Shiraishi | G06F 11/3604 |

OTHER PUBLICATIONS

Jaygarl et al, "OCAT: Object Capture based Automated Testing", ACM, pp. 159-169 (Year: 2010).*
Do et al, "Debugging Static Analysis", IEEE, pp. 1-13 (Year: 2018).*
Cole et al, "Improving Your Software Using Static Analysis to Find Bugs", ACM, pp. 673-674 (Year: 2006).*
Spath et al, "IDEal : Efficient and Precise Alias-Aware Dataflow Analysis", ACM, pp. 1-27 (Year: 2017).*
Wiedermann et al, "Extracting Queries by Static Analysis of Transparent Persistence", ACM, pp. 199-210 (Year: 2007).*
Borodin "Summary based static analysis for practical search for defects in C programs and libraries", IEEE, pp. 231-232 (Year: 2014 ).*
Amari H., et al., "A Virtual Reality Application for Software Visualization," Proceedings of IEEE Virtual Reality Annual International Symposium, Sep. 18-22, 1993, pp. 1-6, XP000457674.
Ansaloni D., et al., "Enabling Modularity and Re-use in Dynamic Program Analysis Tools for the Java Virtual Machine," ECOOP 2013: Object-Oriented Programming, Jul. 2013, vol. 7920, pp. 352-377, XP047033411.
Extended European Search Report for Application No. EP19155467.4, dated Jul. 15, 2019, 12 pages.
Fittkau F., et al., "Software Landscape and Application Visualization for System Comprehension with ExplorViz," Information and Software Technology, Jul. 2017, vol. 87, pp. 259-277, XP029992952.
Seichter H., et al., "ComposAR: An Intuitive Tool for Authoring AR Applications," 7th IEEE/ACM International Symposium on Mixed and Augmented Reality, Sep. 15, 2008, pp. 177-178, XP058352826.
Vincur J., et al., "VR City: Software Analysis in Virtual Reality Environment," 2017 IEEE International Conference on Software Quality, Reliability and Security Companion (QRS-C), Jul. 25, 2017, pp. 509-516, XP033139528, [retrieved on Aug. 7, 2017].

* cited by examiner

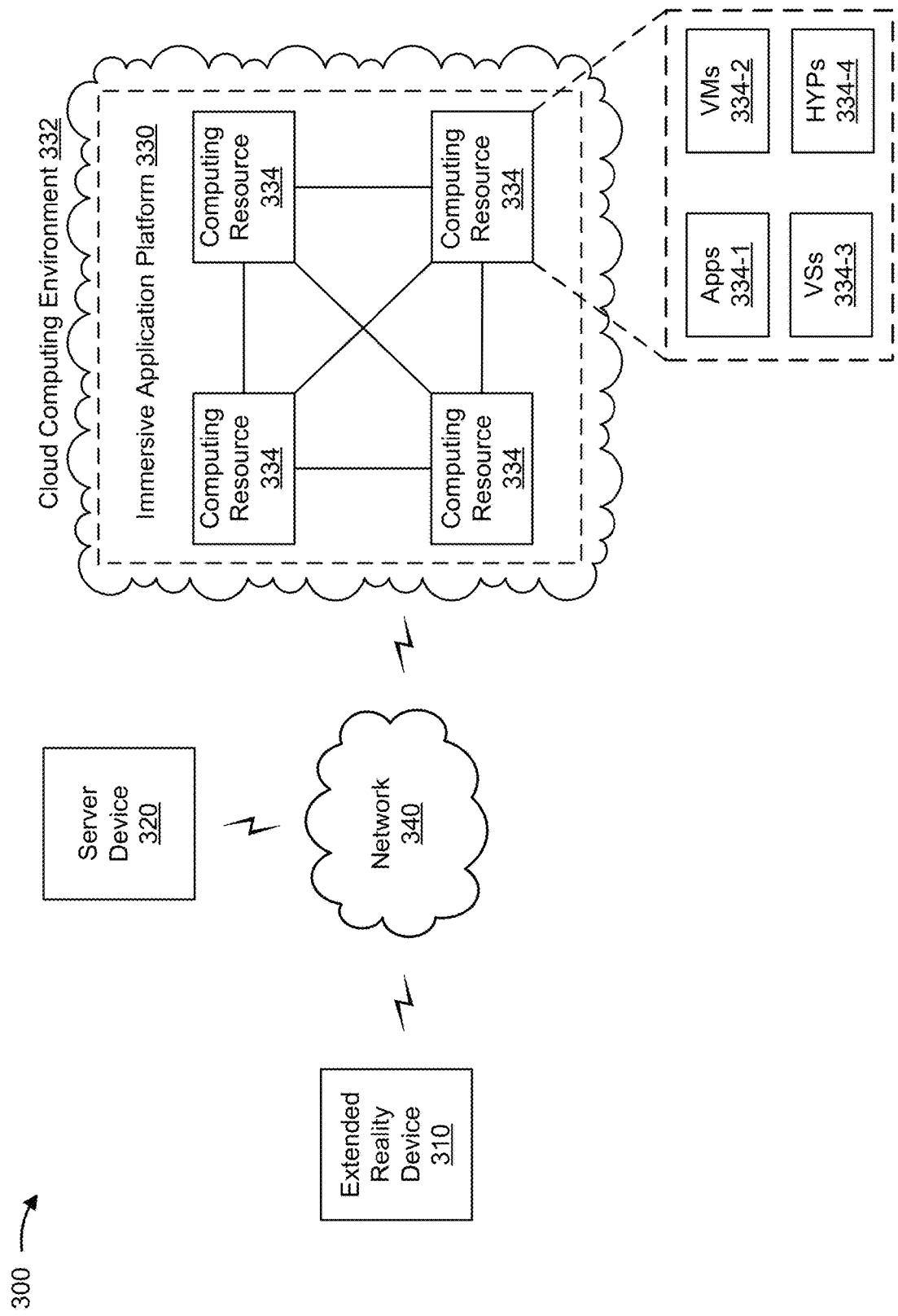

REPRESENTING A TEST EXECUTION OF A SOFTWARE APPLICATION USING EXTENDED REALITY

RELATED APPLICATION

This application claims priority under 35 U.S.C. § 119 to Indian Patent Application No. 201841006007, filed on Feb. 16, 2018, the content of which is incorporated by reference herein in its entirety.

BACKGROUND

Rapid advances are being made in extended reality devices, such as augmented reality devices, virtual reality devices, mixed reality devices, and/or the like. Some studies indicate that immersive experiences with extended reality devices leverage affordances of natural human perception (e.g., spatial memory, motion, manipulation, feedback, and/or the like) for better comprehension of three-dimensional (3D) visualizations and enhanced creativity.

SUMMARY

According to some implementations, a device may include one or more memories, and one or more processors, communicatively coupled to the one or more memories, to instrument a codebase associated with a software application. The one or more processors may execute a test on the instrumented codebase as the instrumented codebase executes, wherein the instrumented codebase generates test data based on the test being executed. The one or more processors may generate, based on the test data, a live graphical model of the codebase from a composite graphical model of the codebase, wherein the composite graphical model includes historical information, associated with the codebase, mapped to a graphical model of the codebase. The one or more processors may generate an extended reality rendered view of the live graphical model. The one or more processors may provide, to an extended reality device, the extended reality rendered view of the live graphical model for display by the extended reality device.

According to some implementations, a method may include instrumenting, by a device, a codebase associated with a software application. The method may include executing, by the device, a test on the instrumented codebase as the instrumented codebase executes, wherein the instrumented codebase generates test data based on the test being executed. The method may include generating, by the device, a live graphical model of the codebase from a composite graphical model of the codebase, wherein the composite graphical model includes historical information, associated with the codebase, mapped to a graphical model of the codebase, and wherein the graphical model of the codebase is converted to a domain specific language based on a structure of the codebase and one or more metrics associated with the codebase. The method may include generating, by the device, an extended reality rendered view of the live graphical model. The method may include providing, by the device and to an extended reality device, the extended reality rendered view of the live graphical model for display by the extended reality device.

According to some implementations, a non-transitory computer-readable medium may store instructions that include one or more instructions that, when executed by one or more processors of a device, cause the one or more processors to instrument a codebase associated with a software application. The one or more instructions may cause the one or more processors to execute a test on the instrumented codebase as the instrumented codebase executes, wherein the instrumented codebase generates test data based on the test being executed. The one or more instructions may cause the one or more processors to generate a live graphical model of the codebase from a composite graphical model of the codebase. The one or more instructions may cause the one or more processors to generate an extended reality rendered view of the live graphical model. The one or more instructions may cause the one or more processors to provide, to an extended reality device, the extended reality rendered view of the live graphical model for display be the extended reality device. The one or more instructions may cause the one or more processors to receive an input associated with the execution of the test on the instrumented codebase. The one or more instructions may cause the one or more processors to modify the extended reality rendered view of the live graphical model based on the input. The one or more instructions may cause the one or more processors to provide, to the extended reality device, the modified extended reality rendered view of the live graphical model for display by the extended reality device.

BRIEF DESCRIPTION OF THE DRAWINGS

FIG. 3 is a diagram of an example environment in which systems and/or methods, described herein, may be implemented.

DETAILED DESCRIPTION

Figure 1A:
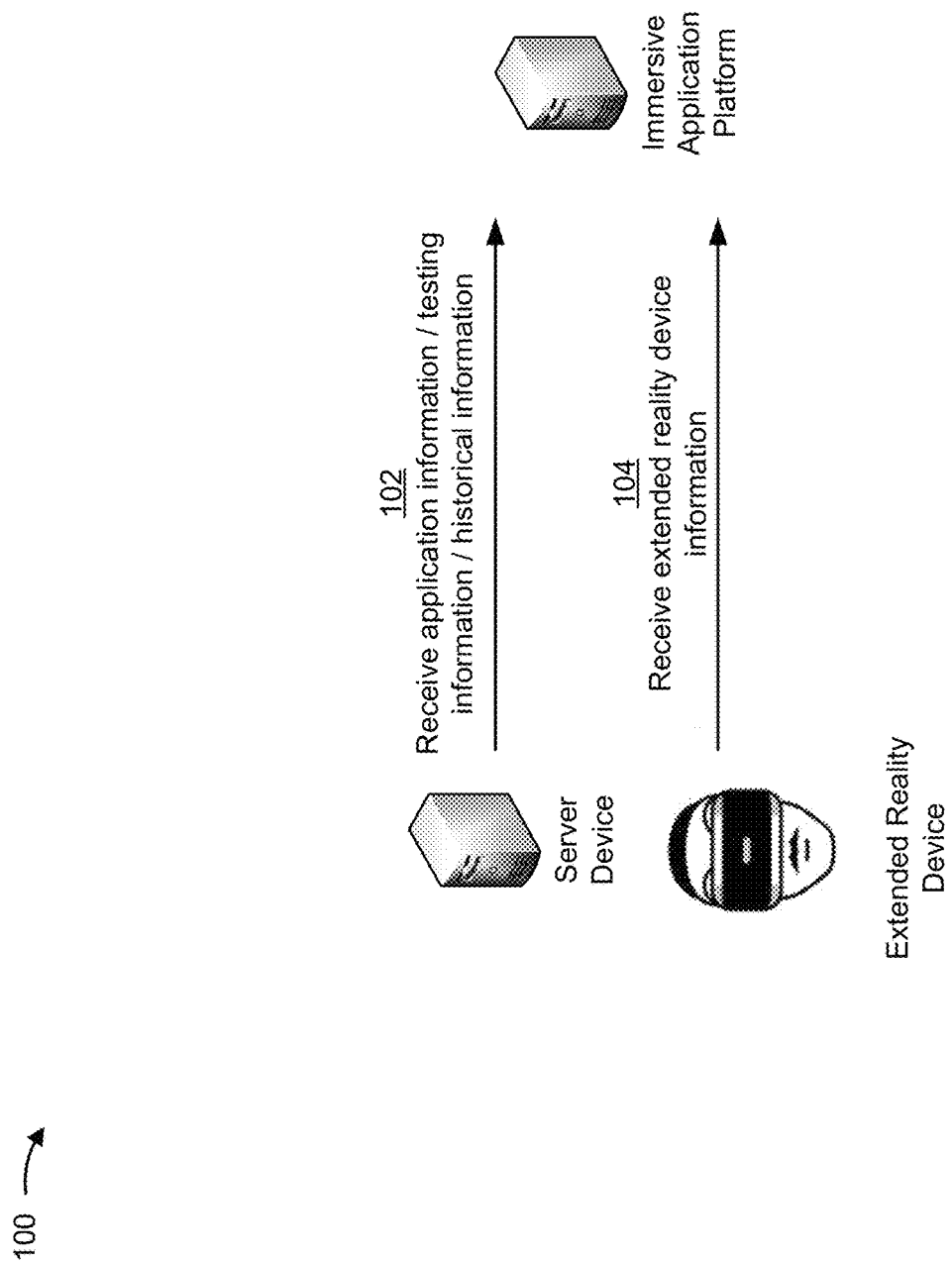
FIGS. 1A-1D are diagrams of an example implementation described herein.

The following detailed description of example implementations refers to the accompanying drawings. The same reference numbers in different drawings may identify the same or similar elements.

Testing of software applications is increasingly becoming more intricate and complex, and can span multiple technologies across distributed locations and data centers. Some software testing techniques may include determining how test scenarios affect different portions of a software application or reviewing traces or logs after test execution and performing an analysis if a test fails. However, reviewing the traces or logs after test execution and/or performing the analysis if the test fails involves detailed code examinations, which may be textual, non-intuitive, and may become directionless if the software application is complex. Moreover, correlating other aspects of the software application (e.g., code quality, code complexity, code cohesion, and/or the like) may involve manual tasks, such as executing and understanding multiple different testing tools.

Some implementations, described herein, provide an immersive application platform that may automatically create an extended reality rendered view of a live graphical model of a codebase for display by an extended reality device. In some implementations, the extended reality rendered view of a live graphical model may display the live graphical model based on a test that is executed on the codebase. The immersive application platform may generate the live graphical model based on test data generated by the test, may modify the live graphical model and/or the extended reality rendered view of the live graphical model as the test is executed on the codebase, and/or the like.

In this way, the immersive application platform may enable users of the extended reality device to comprehend how the software is exercised by the test via a more intuitive medium. In addition, in this way, the immersive application platform may enable users of the extended reality device to automatically visualize dynamic execution traces between one or more elements included in the codebase, hotspots of the codebase, execution times of the one or more elements, dead code included in the codebase, unreachable code included in the codebase, infinite loops in the codebase, redundant code included in the codebase, and/or the like, as well as to understand how the aforementioned correlate with other metrics of the codebase. Moreover, in this way, the immersive application platform may provide the user with faster and better understanding of the structure and relationships of the software application, which in turn allows for rapid software application development, debugging, modifications, and/or the like.

Furthermore, implementations described herein use a computerized process to perform tasks that were not previously performed or were previously performed using subjective human intuition or input. For example, prior software application testing approaches include reviewing testing logs after a test is executed, and then if the test fails, attempting to perform a postmortem analysis involving detailed code walkthroughs, which may be textual, non-intuitive and may quickly become directionless if multiple subsystems are involved without the ability to view a holistic view of the software application. Finally, automatically creating the extended reality rendered view of the live graphical model for the extended reality device conserves computing resources (e.g., processors, memory, and/or the like) that would otherwise be wasted in unsuccessfully attempting to comprehend the test results associated with the software application using other techniques.

FIGS. 1A-1D are diagrams of an example implementation 100 described herein. As shown in FIGS. 1A-1D, implementation 100 may include a server device, an extended reality device, an immersive application platform, and/or the like.

The server device may store and/or transmit various types of information to the immersive application platform, to the extended reality device, and/or the like. The information may include application information associated with a software application, testing information associated with the software application, historical information associated with the software application, and/or the like. In some implementations, the application information may include a codebase associated with the software application, design information for the software application, and/or the like. In some implementations, the testing information may include information identifying one or more tests that are to be executed on the software application, parameters for the one or more tests, one or more test scripts that are to be executed for the one or more tests, and/or the like. In some implementations, the historical information may include historical test data associated with the software application, historical outputs from one or more dynamic analysis testing tools that tested the software application, and/or the like.

The extended reality device may include an augmented reality device, a virtual reality device, a mixed reality device, and/or the like, that is capable of displaying an extended reality rendered view associated with a software application. In some implementations, the extended reality device may be a wearable device (e.g., a virtual reality headset, an augmented reality headset, etc.), a hand-held device (e.g., a smartphone, a tablet computer, etc.), another type of device (e.g., a server device, a desktop computer device, etc.), and/or the like. In some implementations, the extended reality device may provide information to the immersive application platform. For example, the extended reality device may provide information associated with the extended reality device, such as information identifying an extended reality device type associated with the extended reality device (e.g., an augmented reality device, a virtual reality device, a mixed reality device, etc.), environmental information associated with the extended reality device (e.g., information identifying one or more lighting parameters of the extended reality device, information identifying one or more spatial data parameters of the extended reality device, etc.), and/or the like.

The immersive application platform may include one or more devices capable of receiving information from the server device, from the extended reality device, and/or the like; capable of executing a test of a software application, capable of generating an extended reality rendered view associated with the test of the software application; capable of providing the extended reality rendered view to the extended reality device, the server device, and/or the like; capable of receiving an input associated with the extended reality rendered view, associated with the test of the software application, and/or the like; capable of modifying the extended reality rendered view based on the input; and/or the like.

In some implementations, the immersive application may include various components, such as an instrumentation component, a test execution component, a modelling component, a rendering component, an interaction component, and/or the like.

In some implementations, the instrumentation component may insert instrumentation code into a codebase associated with a software application. The instrumentation code may provide various virtual sensors that generate test data as the codebase executes. In some implementations, the test execution component may execute one or more tests on the instrumented codebase, while the instrumented codebase is executing, to generate the test data. The immersive application platform may use the test data to monitor the codebase, measure a level of performance of the codebase, to diagnose errors associated with the codebase, and to generate execution trace information associated with the codebase, and/or the like.

In some implementations, the modelling component may generate a composite graphical model of the codebase from a graphical model of the codebase. The composite graphical model of the codebase may include historical information mapped onto the graphical model of the codebase. In some implementations, the modelling component may generate a live graphical model of the codebase from the composite graphical model of the codebase based on test data generated by the instrumented codebase.

In some implementations, the rendering component may generate an extended reality rendered view of the live graphical model, may provide the extended reality rendered view to the extended reality device, and/or the like. In some implementations, the interaction component may receive an input associated with the extended reality rendered view, may automatically modify the extended reality rendered view and/or automatically generate a new extended reality rendered view based on the input, and/or the like.

In some implementations, one or more components illustrated as being included in the immersive application platform may be included in the extended reality device. For example, the extended reality device may include the rendering component, the interaction component, and/or the like.

Turning to FIG. 1A, a user may want to view an extended reality view of a particular codebase associated with a software application under test, and accordingly may provide input to the immersive application platform to generate the extended reality view of a test execution of the codebase. As shown by reference number 102, the server device may provide information to the immersive application platform based on the input. In some implementations, the server device may provide the information based on receiving a request to provide the information from the immersive application platform, may automatically provide the information to the immersive application platform based on detecting the user providing the input to the immersive application platform to generate the extended reality view, and/or the like. The information may include application information associated with the software application, testing information associated with the software application, historical information associated with the software application, and/or the like, as described above.

As shown by reference number 104, the extended reality device may provide information to the immersive application platform. The information may include information associated with the extended reality device, as described above. In some implementations, the extended reality device may provide the information based on receiving a request to provide the information, such as when the immersive application platform requests the information; may automatically provide the information to the immersive application platform based on a user selecting a particular software application to test, and/or the like.

Figure 1B:
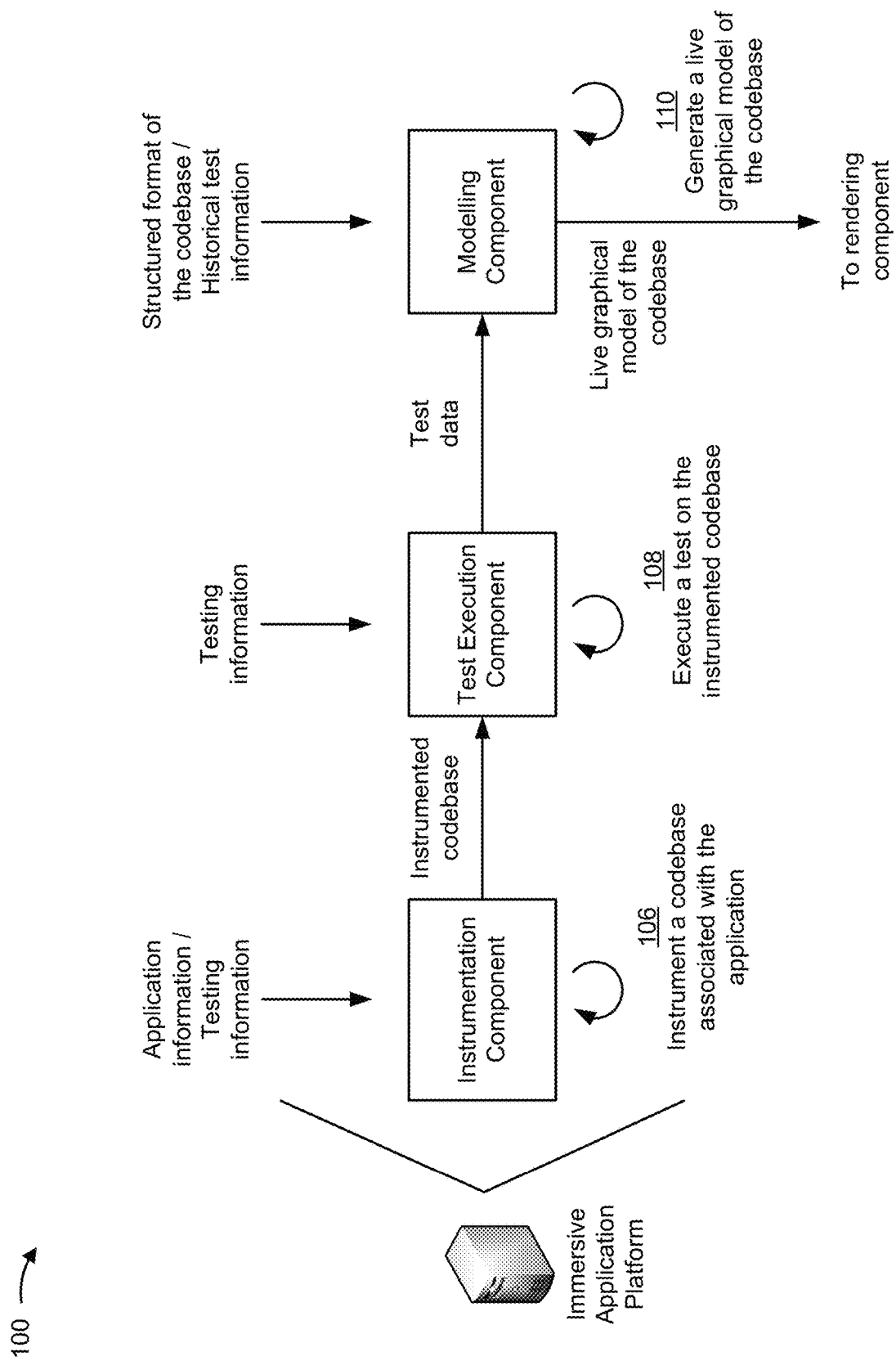

Turning to FIG. 1B, and as shown by reference number 106, the instrumentation component may receive the application information and the testing information, and may instrument the codebase, associated with the software application, based on the application information and/or the testing information. The instrumentation component may instrument the codebase by inserting instrumentation code into the codebase. In some implementations, the instrumentation component may determine the type of instrumentation code, and where in the codebase to insert the instrumentation code, based on the application information, based on the testing information, and/or the like. For example, the testing information may include information identifying one or more types of test data that is to be generated by one or more tests identified in the testing information, and the instrumentation component may instrument the codebase with instrumentation code that may provide one or more virtual sensors that are capable of generating the one or more types of test data. As another example, the testing information may include a pointcut that includes a set of join points, and the set of join points may identify one or more locations, in the codebase, where aspect-orientated implementation code is to be inserted. The one or more locations may include various elements included in the codebase, such as a package, a class, a method, and/or the like.

The instrumentation component may provide the instrumented codebase to the test execution component. The test execution component may also receive the testing information associated with the software application. As shown by reference number 108, the test execution component may execute a test on the instrumented codebase to generate test data. In some implementations, the testing information may include information identifying one or more test scripts that are to be executed by the test execution component, one or more parameters that are to be used for the test, and/or the like. Accordingly, the test execution component may identify the one or more test scripts, and may execute the one or more test scripts to execute the test on the instrumented codebase as the instrumented codebase executes.

In some implementations, the instrumented codebase may generate the test data as the test execution component executes the test on the instrumented codebase. The test data may include information identifying various parameters, such as information identifying whether a particular element, included in the codebase, was executed by the test, information identifying an amount of time the element takes to execute (if executed), information identifying one or more inputs into the element (e.g., values, variables, instructions, calls, and/or the like), information identifying one or more outputs from the element (e.g., values, variables, instructions, calls, and/or the like), information identifying one or more execution traces associated with the element (e.g., information identifying an execution path for the test that includes the element), and/or the like.

The test execution component may provide the test data to the modelling component. In some implementations, the test execution component may provide the test data while the test is being executed (e.g., as a continuous and/or real-time test data feed), may provide the test data after the test is complete, may provide the test data at specified time intervals, may provide the test data based on the modelling component requesting the test data, and/or the like.

The modelling component may receive the test data from the test execution component, may receive the historical information associated with the software application and the application information from the server device, and/or the like. As shown by reference number 110, the modelling component may generate a live graphical model of the codebase. For example, the modelling component may generate the live graphical model of the codebase based on the test data, based on the historical information, based on the application information, and/or the like.

In some implementations, the modelling component may generate the live graphical model of the codebase by generating a graphical model of the codebase included in the application information, may generate a composite graphical model from the graphical model and the historical information, and may generate the live graphical model from the composite graphical model and the test data.

To generate the graphical model of the codebase, the modelling component may perform a static analysis on the codebase to generate the graphical model. In some implementations, the static analysis may include automatically analyzing the codebase to determine a structure of the codebase. The structure of the codebase may include information identifying one or more packages, methods, classes, and/or the like, included in the codebase, one or more relationships between the packages, methods, classes, and/or the like.

In some implementations, the static analysis may include determining one or more metrics associated with the elements included in the codebase. The one or more metrics may include one or more metrics associated with the packages, methods, and/or classes, such as coupling between object classes (CBO) associated with a class (e.g., a quantity of relationships between the class and other classes included in the codebase), a complexity of a method (e.g., a quantity of lines of code in the method), a level of abstraction of a package (e.g., a metric that identifies a package's stability), a class responsibility of a class and/or a package (e.g., a metric that identifies a quantity of pre-conditions and/or post-conditions associated with the class and/or package), a class category relational cohesion of a class and/or a package (e.g., a quantity of relationships between classes in the class and/or package), a quantity of parents associated with a class and/or package (e.g., a quantity of other classes that are the parent of the class), and/or the like.

In some implementations, the modelling component may convert the graphical model from a native programming language of the codebase (e.g., JAVA®, .NET®, C++, etc.) into a domain specific language based on the one or more metrics. The domain specific language may include a programming language configured, purposed, optimized, and/or the like, for representing the codebase using the extended reality device. In this way, the immersive application platform is capable of generating extended reality views in a programming language-agnostic way, which increases the compatibility of the immersive application platform for a variety of programming languages.

In some implementations, the modelling component may convert the graphical model into the domain specific language using a toolkit, one or more data stores, and/or the like, that includes information specifying how to convert variables, objects, operators, methods, expressions, meanings, context, and/or the like, of the original programming language associated with the codebase, to variables, objects, operators, methods, expressions, meanings, context, and/or the like, of the domain specific language. In some implementations, the modelling component may annotate the graphical model with the one or more metrics. For example, the modelling component may annotate the packages, classes, methods, and/or the like, included in the codebase with the one or more metrics associated with the packages, classes, methods, and/or the like. In some implementations, the modelling component may store the graphical model in a structured electronic file, such as an extensible mark-up language (XML) file, a GraphML file, a JavaScript object notation (JSON®) file, and/or the like.

In some implementations, to generate the composite graphical model, the modelling component may map the historical information onto the graphical model. For example, the modelling component may map historical test data (e.g., historical test data associated with one or more previous tests executed on the codebase), historical outputs from one or more dynamic analysis tools (e.g., historical outputs generated by the codebase as the codebase is exercised by a dynamic analysis tool while the codebase is executing), and/or the like, included in the historical information, onto particular elements included in the codebase.

In some implementations, to generate the live graphical model from the composite graphical model, the modelling component may map the test data, generated by the instrumented codebase based on the test being executed, onto the composite graphical model. For example, the modelling component may associate, with a particular element included in the codebase, information identifying that the element was executed by the test, information identifying an execution duration of the element (e.g., an amount of time the element takes to execute), information identifying an input to the element, information identifying an output to the element, information identifying execution trace information associated with the element, and/or the like. In some implementations, the modelling component may map the test data onto the composite graphical model while the test is being executed, once the test is complete, at periodic intervals, and/or the like.

In some implementations, the modelling component may perform one or more analyses of the composite graphical model, and may combine the results of the one or more analyses with the composite graphical model to generate the live graphical model. In some implementations, the modelling component may perform the one or more analyses of the composite graphical model while the test is being executed, once the test is complete, at periodic intervals, and/or the like. In some implementations, the one or more analyses may include a hotspot analysis (e.g., an analysis that determines a quantity of times an element included in the codebase is executed by the test), a dead code analysis (e.g., an analysis that determines whether an output generated by an element included in the code base is not used as input to another element included in the codebase), an unreachable code analysis (e.g., an analysis that determines whether an element, or code included in an element, does not execute because there may be no link to the element and/or code in the codebase), an infinite loop analysis (e.g., an analysis of whether there is an execution loop of one or more elements that does not terminate due to no termination point for the loop existing in the codebase, due to the criteria for the termination point being unable to be satisfied, and/or the like), a redundant code analysis (e.g., an analysis of whether the codebase includes redundant code), an analysis of whether one or more elements, included in the codebase, uses data from an untrusted source, an analysis of whether the one or more elements, included in the codebase, provides data to the untrusted source, and/or the like.

Figure 1C:
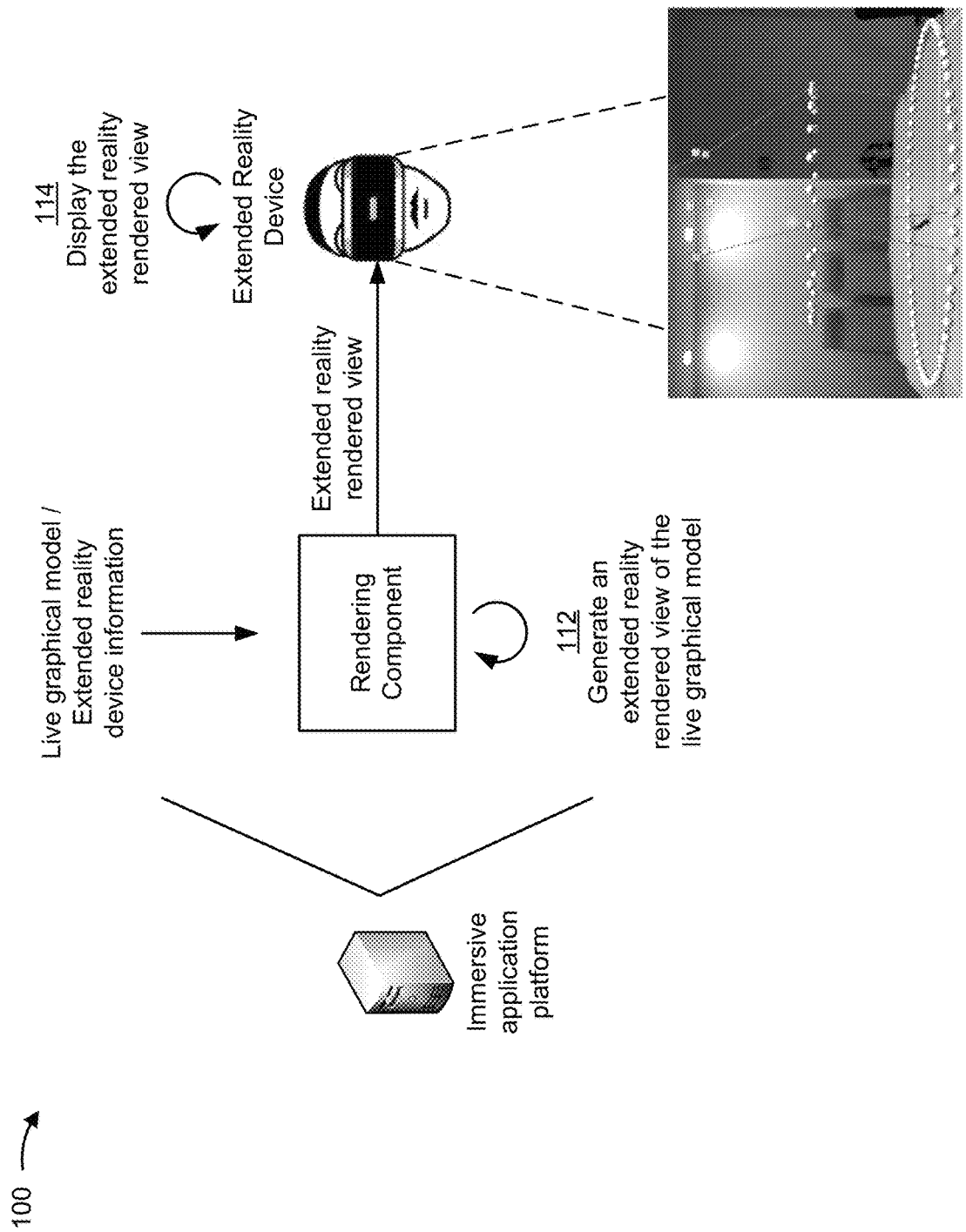

Turning to FIG. 1C, the modelling component may provide the live graphical model to the rendering component. As shown by reference number 112, the rendering component may receive the live graphical model and/or the extended reality device information, and may generate an extended reality rendered view of the live graphical model. In some implementations, to generate the extended reality rendered view, the rendering component may select topology that is to be used to display the live graphical model in the extended reality rendered view. Examples of topologies that may be used to display the live graphical model may include a three-dimensional tree hierarchy, a random topology, a three-dimensional undirected or directed graph, and/or the like. In some implementations, the rendering component may select the topology based on one or more properties associated with the codebase, such as a quantity of elements (e.g., packages, classes, methods, etc.) included in the codebase, based on a quantity of relationships between elements (e.g., a quantity of relationships between elements of the same type, a quantity of relationships between elements of different types, etc.), and/or the like; based on the extended reality device information (e.g., based on whether the extended reality device is an augmented reality device, a virtual reality device, a mixed reality device, and/or the like); based on one or more preferences of a user using the extended reality device; based on one or more properties associated with the test executed on the codebase (e.g., based on a quantity of test scripts executed on the codebase, based on a quantity of elements, included in the codebase, that is exercised by the test, based on a test type associated with the test, and/or the like); and/or the like.

Based on selecting the topology, the rendering component may select one or more objects to be displayed in the topology. In some implementations, the one or more objects may represent the elements included in the codebase, may represent one or more properties associated with the elements, may represent execution traces in the codebase, and/or the like. In some implementations, the one or more objects may include various two-dimensional and/or three-dimensional shapes, such as a cube, a sphere, a prism, and/or the like; may include various two-dimensional and/or three-dimensional icons, such as a package icon, a box icon, and/or the like. In some implementations, the rendering component may select the one or more objects based on the structure of the codebase, based on a type of programming language associated with the codebase, based on user input, and/or the like. In some implementations, the rendering component may select a different object to represent each type of element included in the codebase.

In some implementations, rendering component may modify the extended reality rendered view. In some implementations, the rendering component may modify the extended reality rendered view based on information provided by the extended reality device. For example, where the extended reality device is an augmented reality device or a mixed reality device, the rendering component may utilize a light estimation output, included in the lighting information provided by the extended reality device, in order to determine a level of transparency of the objects included in the extended reality rendered view, to determine a level of brightness of the objects included in the extended reality rendered view, and/or the like. In some implementations, the rendering component may utilize spatial information (e.g., information associated with one or more environmental objects included in the real world environment, information identifying an estimated space of the real world environment, etc.), included in the information associated with the extended reality device, to determine a size of the objects included in the extended reality rendered view, to determine a shape of the objects included in the extended reality rendered view, to determine a placement of the objects included in the extended reality rendered view, and/or the like. For example, as shown in FIG. 1C, the extended reality rendered view may include a three-dimensional live graphical model, that includes objects and execution traces between the objects, that is rendered on a real-world conference room table.

As shown by reference number 114, the extended reality device may display the extended reality rendered view of the live graphical model. In this way, the user of the extended reality device may view the extended reality rendered view of the live graphical model, may view changes to the live graphical model as the test is executed on the instrumented codebase (e.g., may view changes to one or more properties of the elements included in the codebase, may view execution traces that are dynamically generated as the test is executed, and/or the like), may interact with the extended reality rendered view of the live graphical model, and/or the like.

In some implementations, the user may interact with the extended reality rendered view using various gestures, voice input, input via one or more input devices, and/or the like, to manipulate, modify, navigate, and/or change the extended reality view. For example, the user may interact with the extended reality view by using hand gestures (e.g., a swiping gesture to rotate the extended reality rendered view, a pinch gesture to zoom the extended reality rendered view, etc.), by using voice command (e.g., a voice command to focus in on a particular object in the extended reality view, etc.), by providing an input to execute a particular test script included in the test, by providing an input to pause or stop the test, by providing an input to rerun a particular test script, and/or the like.

Figure 1D:
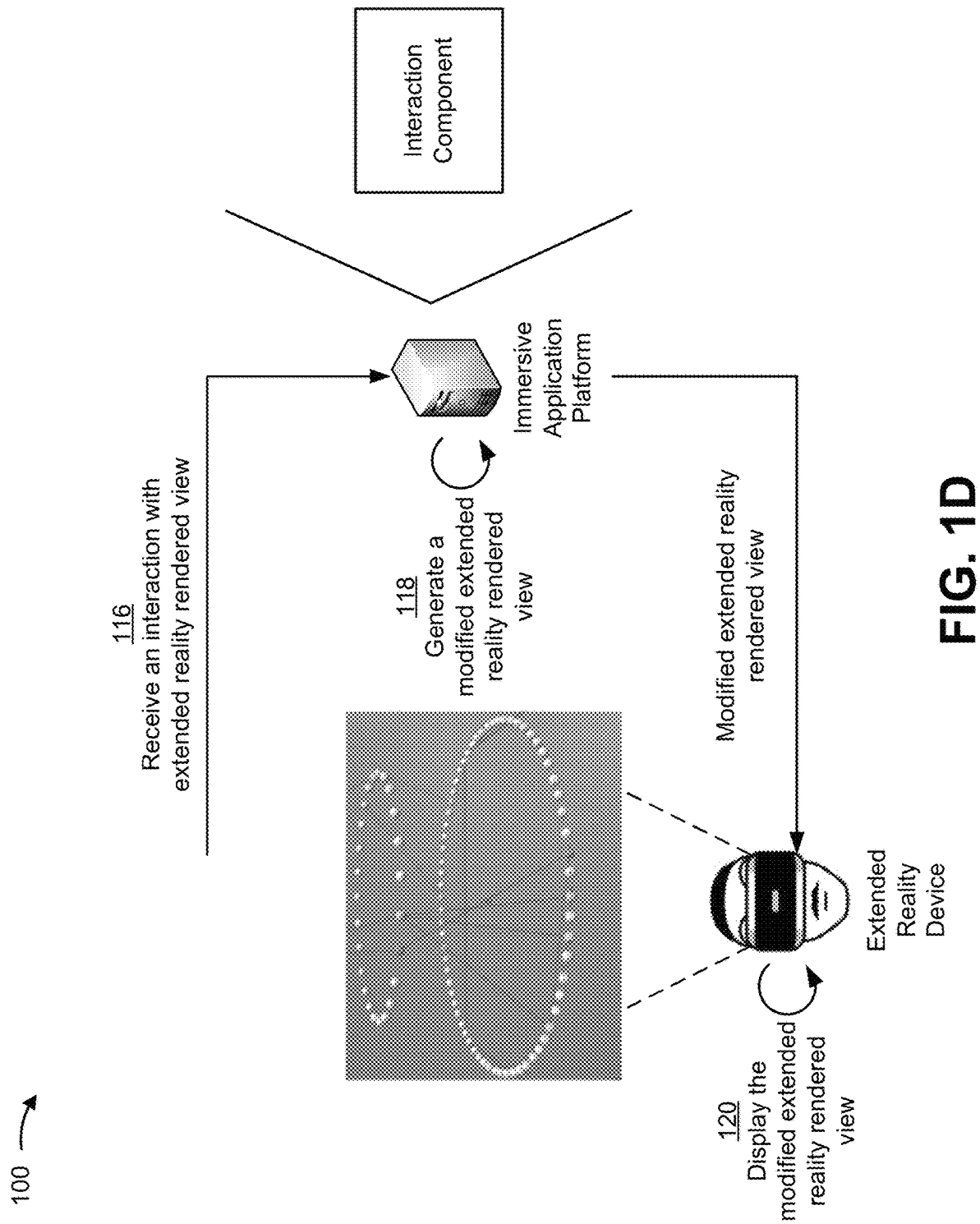

Turning to FIG. 1D, and as shown by reference number 116, the immersive application platform may receive an input associated with a user interaction with the extended reality rendered view of the live graphical model. For example, the interaction component of the immersive application platform may detect the interaction (e.g., a gesture, a voice command, an input via an input device, etc.), and determine whether the interaction is associated with one or more actions that are associated with the extended reality rendered view.

As shown by reference number 118, based on determining that the interaction is associated with one or more actions that are associated with the extended reality rendered view, the interaction component may generate a modified (e.g., an updated, manipulated, new, etc.) extended reality rendered view based on the one or more actions. For example, the interaction component may determine that the interaction is associated with a zoom action, and thus the interaction component may modify the extended reality rendered view by zooming in the extended reality view. As another example, the interaction component may determine that the interaction is associated with an action to pause or stop the test being executed on the instrumented codebase, and may pause or stop the test based on the interaction.

As further shown in FIG. 1D, the immersive application platform may provide the modified extended reality rendered view to the extended reality device. As shown by reference number 120, the extended reality device may display the modified extended reality rendered view, and the user may view the modified extended reality rendered view, may interact with the modified extended reality rendered view, and/or the like.

In this way, the immersive application platform may enable users of the extended reality device to comprehend how the software is exercised by the test via a more intuitive medium. In addition, in this way, the immersive application platform may enable users of the extended reality device to automatically visualize dynamic execution traces between one or more elements included in the codebase, hotspots of the codebase, execution times of the one or more elements, dead code included in the codebase, unreachable code included in the codebase, infinite loops in the codebase, redundant code included in the codebase, and/or the like, as well as to understand how the aforementioned correlate with other metrics of the codebase. Moreover, in this way, the immersive application platform may provide the user with faster and better understanding of the structure and relationships of the software application, which in turn allows for rapid software application development, debugging, modifications, and/or the like.

Furthermore, implementations described herein use a computerized process to perform tasks that were not previously performed or were previously performed using subjective human intuition or input. For example, prior software application testing approaches include reviewing testing logs after a test is executed, and then if the test fails, attempting to perform a postmortem analysis involving detailed code walkthroughs, which may be textual, non-intuitive and may quickly become directionless if multiple subsystems are involved without the ability to view a holistic view of the software application. Finally, automatically creating the extended reality rendered view of the live graphical model for the extended reality device conserves computing resources (e.g., processors, memory, and/or the like) that would otherwise be wasted in unsuccessfully attempting to comprehend the test results associated with the software application using other techniques.

As indicated above, FIGS. 1A-1D is provided merely as an example. Other examples are possible and may differ from what was described with regard to FIGS. 1A-1D.

Figure 2A:
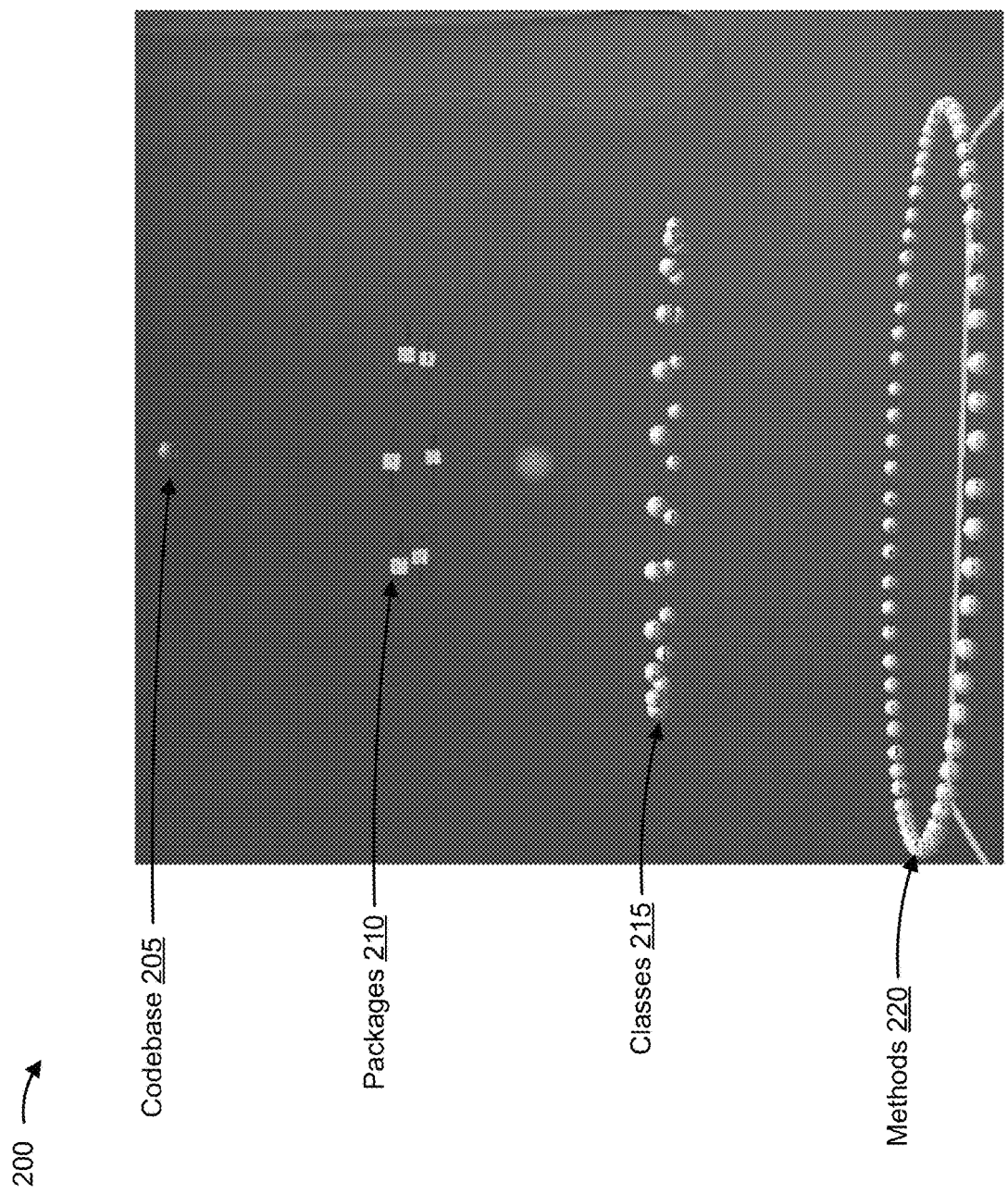
FIGS. 2A-2C are illustrations of example extended reality rendered views that may be generated by an immersive application platform described herein.
Figure 2B:
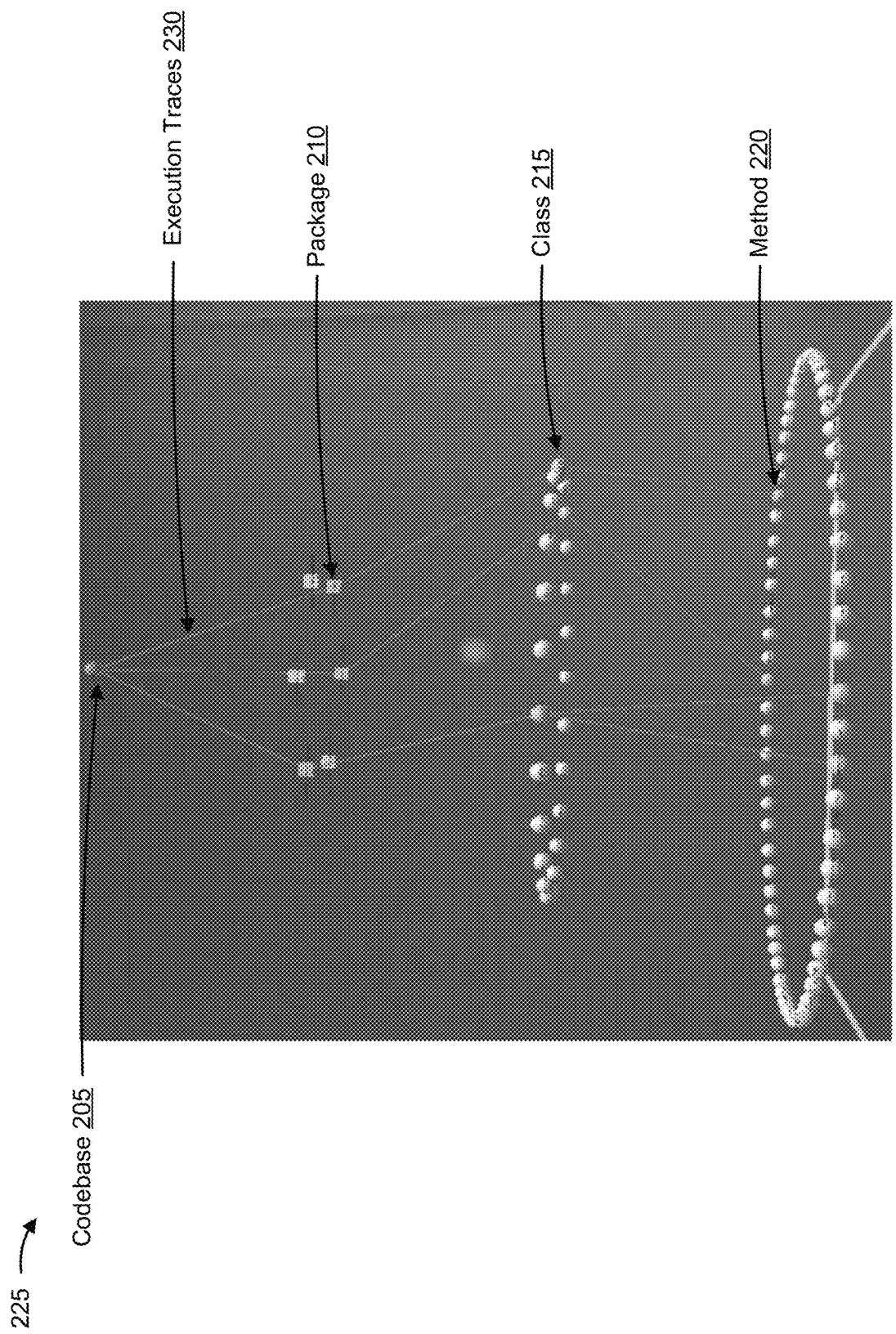
Figure 2C:
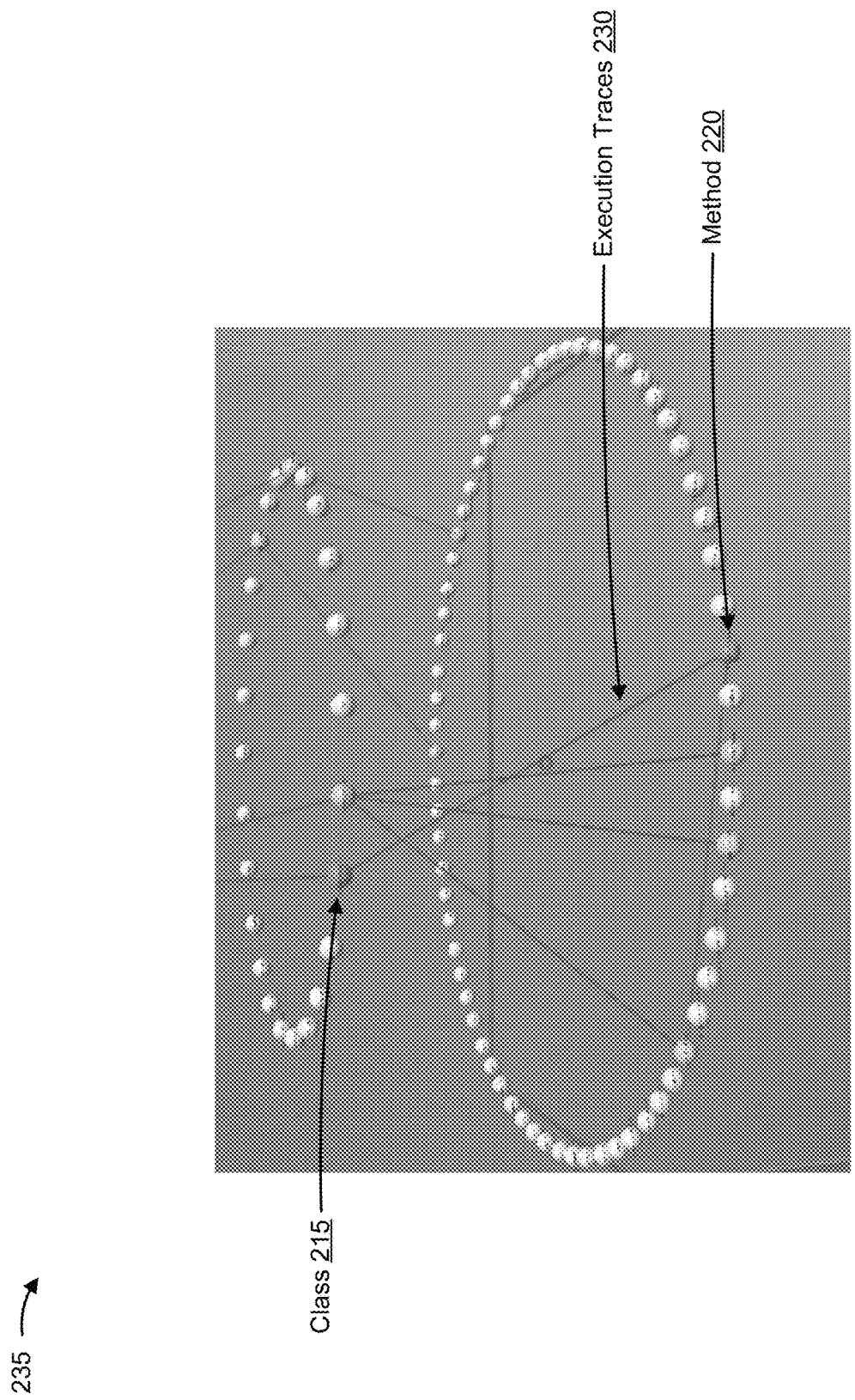

FIGS. 2A-2C are illustrations of example extended reality rendered views that may be generated by an immersive application platform, as described herein, and displayed by an extended reality device, as described herein.

As shown in FIG. 2A, extended reality rendered view 200, may display a codebase 205 in 3D form. In some implementations, extended reality rendered view 200 may include a hierarchical view of one or more elements included in codebase 205. For example, and as shown in FIG. 2A, extended reality rendered view 200 may include a rendering of one or more packages 210 (collectively referred to as "packages 210" and individually as "package 210") included in codebase 205, one or more classes 215 (collectively referred to as "classes 215" and individually as "class 215") included in packages 210, one or more methods 220 (collectively referred to as "methods 220" and individually as "method 220") included in classes 215, and/or the like.

In some implementations, each element included in codebase 205 may be represented in extended reality rendered view 200 as an object. Different objects may be used to distinguish between different types of elements. For example, and as shown in FIG. 2A, packages 210 may be displayed as orange cubes, classes 215 may be displayed as red spheres, and methods 220 may be displayed as green spheres. Any other shapes, colors, and/or types of objects, and/or combinations thereof, may be used to represent the elements included in codebase 205.

In some implementations, a user may interact with extended reality rendered view 200 using various techniques, such as gesture (e.g., hand-movement gestures, arm-movement gestures, finger-movement gestures, head-movement gestures, etc.), a voice command, providing an input via an input device, and/or the like, to provide an input to the immersive application platform. For example, the user may use a pinch to zoom gesture to zoom in or out in extended reality rendered view 200, may use a voice command to select a particular element included in codebase 205, may use a swiping gesture to rotate the structure of codebase 205 in extended reality rendered view 200, and/or the like.

In some implementations, the immersive application platform may automatically modify extended reality rendered view 200 based on the user's interaction with extended reality rendered view 200, based on receiving an instruction, and/or the like.

Turning to FIG. 2B, based on receiving an instruction, the immersive application platform may generate an extended reality rendered view 225, and may provide extended reality rendered view 225 to the extended reality device for display by the extended reality device. For example, the user may provide an input to the immersive application platform to execute a test on codebase 205, may automatically execute the test on codebase 205 based on the user selecting codebase 205, and/or the like.

As shown in FIG. 2B, extended reality rendered view 225 may include a rendering of a plurality of execution traces 230 (collectively referred to as "execution traces 230" and individually as "execution trace 230"). Execution traces 230 may represent an execution path associated with the test. For example, an execution traces 230 between a package 210 and a class 215 may indicate that the test caused package 210 to call class 215, provide an output to class 215, receive an input from class 215, and/or the like. In this way, the user may view the representations of execution traces 230 to determine how elements included in codebase 205 are exercised by the test, how elements included in codebase 205 are related, and/or the like, such that execution traces 230 may be used for developing codebase 205, identifying issues with codebase 205, debugging the issues with codebase 205, and/or the like. This leads to the development of improved software applications, a reduction in the consumption processing and/or memory resources that would have otherwise been used in attempting to understand the issues with codebase 205 based on logging and/or other techniques.

Turning to FIG. 2C, based on a user interaction with extended reality rendered view 200, extended reality rendered view 225, and/or another extended reality rendered view, the immersive application platform may generate an extended reality rendered view 235, and may provide extended reality rendered view 235 to the extended reality device for display by the extended reality device. For example, the user may provide an input in the form of an interaction associated with a zooming action, and the immersive application platform may generate extended reality rendered view 235 such that extended reality rendered view 235 is zoomed and/or focused on one or more particular types of elements included in codebase 205 and/or one or more execution traces 230 between the elements. As shown in FIG. 2C, extended reality rendered view 235 may include a rendering of classes 215, methods 220, and one or more execution traces 230 between classes 215 and methods 220, and between methods 220 and other methods 220 included in codebase 205. In some implementations, the immersive application platform may generate execution traces 230 such that the appearance of execution traces 230 between different types of elements included in codebase 205 (e.g., between classes 215 and methods 220) may be different from the appears of execution traces 230 between the same type of elements (e.g., between methods 220). For example, execution traces 230 between different types of elements may be displayed in a different color, different shape, and/or the like, than execution traces 230 between the same type of element.

In some implementations, a visual indicator may be used to indicate various properties associated with a particular element. For example, and as shown in FIG. 2A, different shades of a particular color of an object associated with a particular element may be used to indicate a quantity of times the particular element is executed by the test, may be used to indicate an execution duration of the particular element, and/or the like. Any other types of visual indicator may be used, such as the size of an object, different colors, an order of objects in extended reality rendered view 200, and/or the like. In some implementations, the visual indicators may dynamically change in the extended reality rendered views (e.g., extended reality rendered view 200, extended reality rendered view 225, extended reality rendered view 235, and/or the like) as the test is executed. For example, the shade of a particular color of an object associated with a particular element may become progressively darker, lighter, and/or the like, as the quantity of times the particular element is executed by the test increases, as an average execution duration of the particular element increases and/or decreases, and/or the like.

As indicated above, FIGS. 2A-2C is provided merely as an example. Other examples are possible and may differ from what was described with regard to FIGS. 2A-2C.

FIG. 3 is a diagram of an example environment 300 in which systems and/or methods, described herein, may be implemented. As shown in FIG. 3, environment 300 may include an extended reality device 310, a server device 320, an immersive application platform 330, a network 340, and/or the like. Devices of environment 300 may interconnect via wired connections, wireless connections, or a combination of wired and wireless connections.

Extended reality device 310 includes one or more devices capable of receiving, generating, storing, processing, and/or providing information, such as information described herein. For example, extended reality device 310 may receive information from and/or transmit information to immersive application platform 330, server device 320, and/or the like.

In some implementations, extended reality device 310 may include an augmented reality device, a virtual reality device, a mixed reality device, a gaming device, a wearable communication device (e.g., a smart wristwatch, a pair of smart eyeglasses, etc.), or a similar type of device. In some implementations, extended reality device 310 may be a hand-held device, a head-mounted device, another type of wearable device, and/or the like. In some implementations, extended reality device 310 may receive an extended reality rendered view of a live graphical model associated with a test executed on a codebase associated with a software application, may display the extended reality rendered view of the live graphical model, may receive an input associated with the extended reality rendered view of the live graphical model, may provide the input to immersive application platform 330, may receive a modified extended reality rendered view of the live graphical model, may display the modified extended reality rendered view of the live graphical model, and/or the like.

Server device 320 includes one or more devices capable of receiving, generating, storing, processing, and/or providing information, such as information described herein. For example, server device 320 may include a laptop computer, a tablet computer, a desktop computer, a server device, a group of server devices, or a similar type of device, which provides application information associated with a software application, testing information associated with the software application, historical information associated with the software application, and/or the like, to immersive application platform 330. In some implementations, server device 320 may receive information from and/or transmit information to extended reality device 310 and/or immersive application platform 330.

Immersive application platform 330 includes one or more devices capable of automatically creating an immersive representation of a software application for extended reality device 310. For example, immersive application platform 330 may include one or more devices capable of receiving information from server device 320, from the extended reality device 310, and/or the like; capable of generating an extended reality rendered view of a live graphical model associated with a test executed on a codebase of a software application; capable of providing the extended reality rendered view of the live graphical model to the extended reality device, the server device, and/or the like; capable of receiving an input, associated with the extended reality rendered view of the live graphical model and/or associated with the test; capable of modifying the extended reality rendered view of the live graphical model; and/or the like.

In some implementations, immersive application platform 330 may be designed to be modular such that certain software components may be swapped in or out depending on a particular need. As such, immersive application platform 330 may be easily and/or quickly reconfigured for different uses. In some implementations, immersive application platform 330 may receive information from and/or transmit information to extended reality device 310 and/or server device 320.

In some implementations, as shown, immersive application platform 330 may be hosted in a cloud computing environment 332. Notably, while implementations described herein describe immersive application platform 330 as being hosted in cloud computing environment 332, in some implementations, immersive application platform 330 may not be cloud-based (i.e., may be implemented outside of a cloud computing environment) or may be partially cloud-based.

Cloud computing environment 332 includes an environment that hosts immersive application platform 330. Cloud computing environment 332 may provide computation, software, data access, storage, etc. services that do not require end-user knowledge of a physical location and configuration of system(s) and/or device(s) that hosts immersive application platform 330. As shown, cloud computing environment 332 may include a group of computing resources 334 (referred to collectively as "computing resources 334" and individually as "computing resource 334").

Computing resource 334 includes one or more personal computers, workstation computers, server devices, or other types of computation and/or communication devices. In some implementations, computing resource 334 may host immersive application platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 includes a group of cloud resources, such as one or more applications ("APPs") 334-1, one or more virtual machines ("VMs") 334-2, virtualized storage ("VSs") 334-3, one or more hypervisors ("HYPs") 334-4, and/or the like.

Application 334-1 includes one or more software applications that may be provided to or accessed by extended reality device 310. Application 334-1 may eliminate a need to install and execute the software applications on extended reality device 310. For example, application 334-1 may include software associated with immersive application platform 330 and/or any other software capable of being provided via cloud computing environment 332. In some implementations, one application 334-1 may send/receive information to/from one or more other applications 334-1, via virtual machine 334-2.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user (e.g., a user of extended reality device 310 or an operator of immersive application platform 330), and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 may provide hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Network 340 includes one or more wired and/or wireless networks. For example, network 340 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
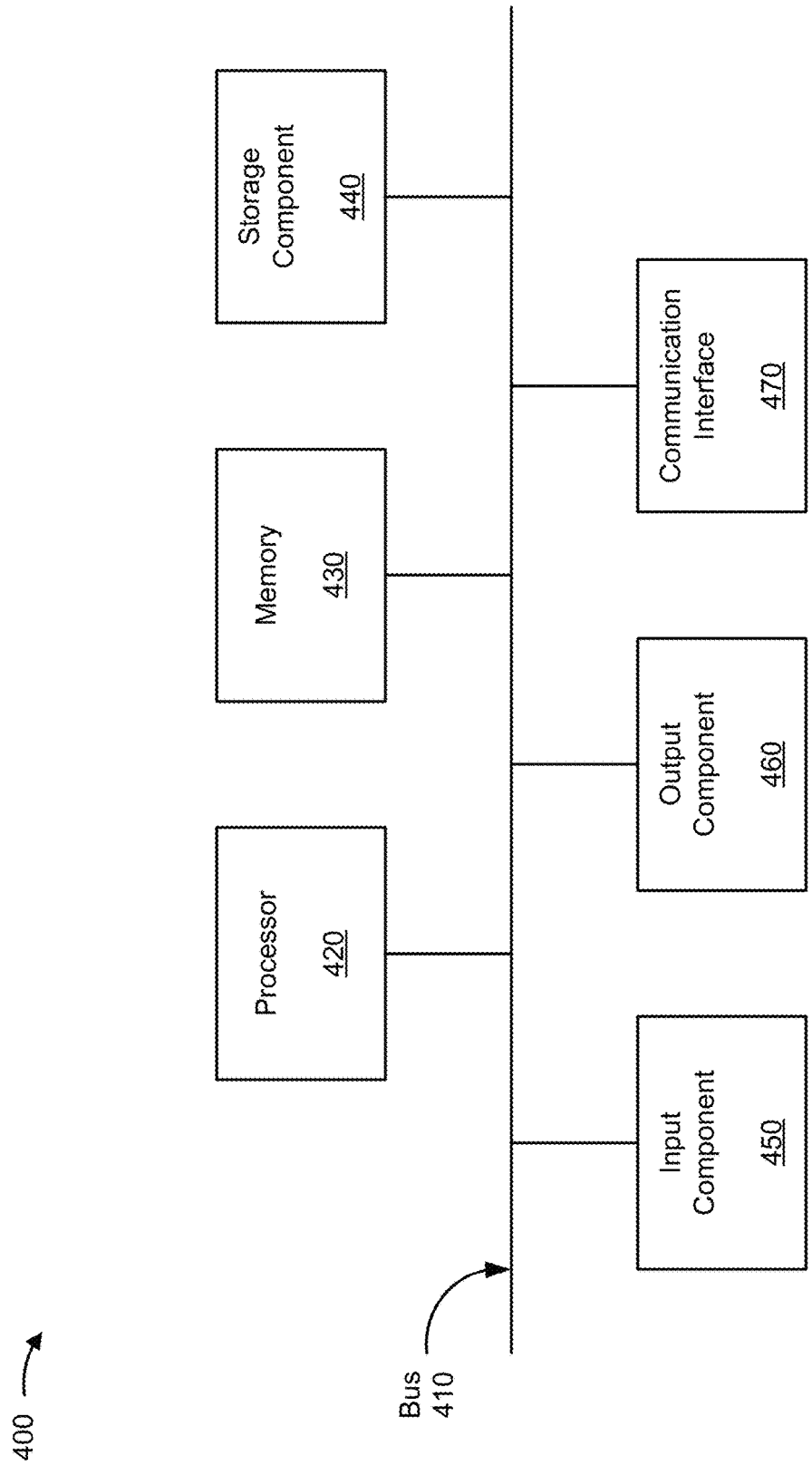
FIG. 4 is a diagram of example components of one or more devices of FIG. 3.

FIG. 4 is a diagram of example components of a device 400. Device 400 may correspond to extended reality device 310, server device 320, immersive application platform 330, computing resource 334, and/or one or more devices included in network 340. In some implementations, extended reality device 310, server device 320, immersive application platform 330, computing resource 334, and/or one or more devices included in network 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
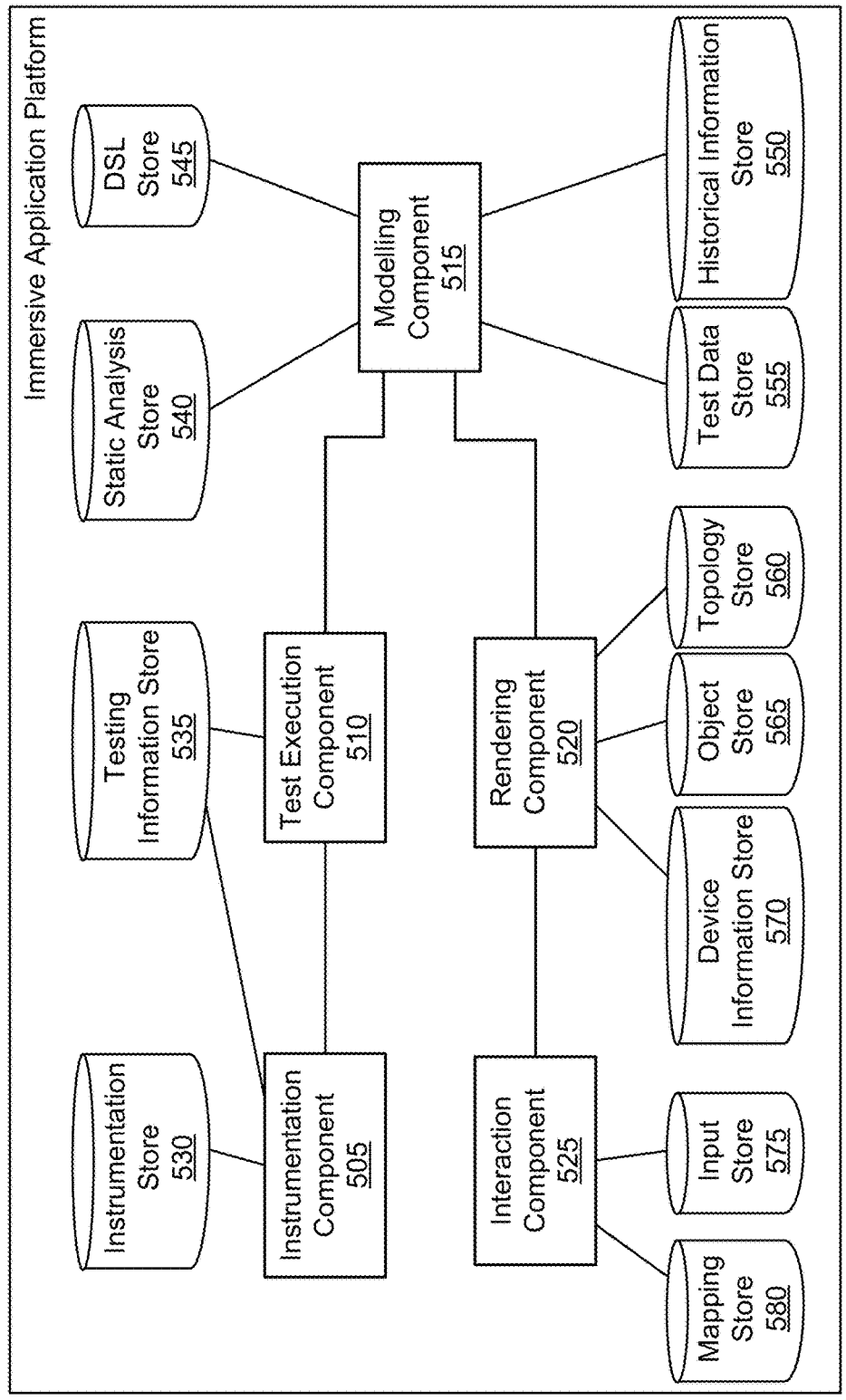
FIG. 5 is a diagram of an example immersive application platform of FIG. 3.

FIG. 5 is a diagram of an example immersive application platform (e.g., immersive application platform 500), as described herein. The immersive application platform 500 may generate a representation of a test that is executed on a codebase of a software application for display by an extended reality device (e.g., extended reality device 310), as described herein. In some implementations, immersive application platform 500 may be implemented by immersive application platform 330 of FIG. 3, by device 400 of FIG. 4, and/or the like.

As shown in FIG. 5, immersive application platform 500 may include various components, such as an instrumentation component 505, a test execution component 510, a modelling component 515, a rendering component 520, an interaction component 525, an instrumentation store 530, a testing information store 535, a static analysis store 540, a domain specific language (DSL) store 545, a historical information store 550, a test data store 555, a topology store 560, an object store 565, a device information store 570, an input store 575, a mapping store 580, and/or the like. In some implementations, the components included in FIG. 5 may be implemented by separate components and/or devices, may be included in the same component and/or device, and/or the like.

Instrumentation component 505 may instrument a codebase associated with a software application. For example, instrumentation component 505 may instrument a codebase associated with a software application, as described above in connection with FIGS. 1A-1D. In some implementations, instrumentation component 505 may obtain instrumentation information stored instrumentation store 530, may obtain testing information stored in testing information store 535, and may instrument the codebase based on the instrumentation information and the testing information. The testing information may include information identifying a test that is to be executed on the codebase. The instrumentation information may include information identifying instrumentation code that is to be inserted into the codebase to generate test data based on the test being executed, may include information identifying a pointcut (e.g., a set of join points identifying one or more locations, in the codebase, where the instrumentation code is to be inserted) associated with the test, and/or the like.

Test execution component 510 may execute a test on the instrumented codebase to generate the test data. For example, test execution component 510 may execute a test on the instrumented codebase, as described above in connection with FIGS. 1A-1D. In some implementations, test execution component 510 may obtain, from testing information store 535, testing information associated with the test, and may execute the test based on the testing information. The testing information may include information identifying one or more test scripts that are to be executed on the instrumented code, one or more parameters for the test, and/or the like. In some implementations, test execution component 510 may store the test data generated by the instrumented codebase in test data store 555.

Modelling component 515 may generate a live graphical model for the test that is executed on the instrumented codebase. For example, modelling component 515 may generate a live graphical model for the test that is executed on the instrumented codebase, as described above in connection with FIGS. 1A-1D. In some implementations, to generate the live graphical model, modelling component 515 may generate a graphical model of the codebase, may generate a composite graphical model from the graphical model, and may generate the live graphical model from the composite graphical model.

In some implementations, to generate the graphical model, modelling component 515 may obtain static analysis information stored in static analysis store 540, and may use the static analysis information to perform a static analysis on the codebase to generate the graphical model. The static analysis information may include information identifying various variables, objects, operators, methods, one or more metrics, a syntax, and/or the like, associated with a native programming language (e.g., JAVA®, .NET®, C++, etc.) of the codebase. Modelling component may use the static analysis information to identify variables, objects, operators, and/or the like, included in the codebase, and may use the static analysis information to identify expressions, meanings, context, and/or the like, included in the codebase.

In some implementations, modelling component 515 may convert the graphical model from the native programming language of the codebase into a domain specific language based on the one or more metrics. For example, modelling component 515 may convert the graphical model into the domain specific language based on information included in DSL store 545. In some implementations, DSL store 545 may include information mapping the lexicon of the native programming language of the codebase to the lexicon of the domain specific language, may include information mapping the syntax of the programming language of the codebase to the syntax of the domain specific language, and/or the like. For example, DSL store 545 may include information mapping the variables, objects, operators, methods, and/or the like, of the programming language associated with the codebase to the variables, objects, operators, methods, and/or the like, of the domain specific language. As another example, DSL store 545 may include information mapping the expressions, meanings, context, and/or the like, of the programming language associated with the codebase to the expressions, meanings, context, and/or the like, of the domain specific language.

In some implementations, to generate the composite graphical model from the graphical model, modelling component 515 may map historical information, associated with the software application, onto the graphical model. In some implementations, modelling component 515 may obtain the historical information from historical information store 550. The historical information may include, for example, information identifying historical test data associated with the codebase of the software application, information identifying historical outputs from one or more dynamic analyses performed on the codebase by one or more dynamic analysis tools, and/or the like.

In some implementations, to generate the live graphical model from the composite graphical model, modelling component 515 may map the test data, stored in test data store 555, onto the composite graphical model, and may perform one or more analyses on the composite graphical model, as described above in connection with FIGS. 1A-1D.

Rendering component 520 may generate an extended reality rendered view of the live graphical model, as described above in connection with FIGS. 1A-1D and 2A-2C. For example, rendering component 520 may generate the extended reality rendered view based on information included in topology store 560, information included in object store 565, and/or the like.

In some implementations, topology store 560 may include information identifying a plurality of different topologies that may be used to display the live graphical model in the extended reality rendered view. Rendering component 520 may select a topology, from the plurality of different topologies included in topology store 560, that is to be used to display the domain specific language format of the codebase in the extended reality rendered view.

In some implementations, object store 565 may include information identifying a plurality of objects that may be used to represent elements included in the codebase. Rendering component 520 may select one or more objects, of the plurality of objects, that are to be used to represent the elements included in the codebase.

In some implementations, rendering component 520 may modify the extended reality rendered view of the live graphical model. In some implementations, rendering component 520 may modify the extended reality rendered view based on information included in device information store 570. For example, device information store 570 may include information associated with the extended reality device, such as lighting information, spatial information, information identifying an extended reality device type associated with the extended reality device, and/or the like.

Interaction component 525 may receive an input associated with a user interaction with the extended reality rendered view of the live graphical model, may receive an input associated with the test that is executed on the instrumented codebase, and/or the like; may modify the extended reality rendered view based on the input, and/or the like. For example, interaction component 525 may modify the extended reality rendered view based on information included in input store 575, based on information included in mapping store 580, and/or the like.

In some implementations, input store 575 may include information identifying one or more gestures (e.g., hand gestures, arm gestures, facial gestures, etc.), information identifying one or more voice commands, information identifying one or more inputs that may be received via another type of input device, and/or the like. Interaction component 525 may identify a gesture, a voice comment, and/or the like, associated with the user interaction, based on the information included in input store 575.

In some implementations, mapping store 580 may include information mapping the gestures, the voice comments, the inputs that may be received from another type of input device, and/or the like, to one or more actions, associated with the extended reality rendered view, associated with the test, and/or the like, that interaction component 525 may perform. Interaction component 525 may identify, based on the information included in mapping store 580, an action, associated with the identified gesture, voice command, and/or or other input, that is to be performed on the extended reality rendered view, on the test, and/or the like. Interaction component 525 may perform the action to modify the extended reality rendered view; to start the test, to stop the test, to pause the test, to rerun the test, and/or the like; and may provide the modified extended reality rendered view to the extended reality device for display by the extended reality device.

The number and arrangement of components shown in FIG. 5 are provided as an example. In practice, immersive application platform 500 may include additional components, fewer components, different components, or differently arranged components than those shown in FIG. 5. Additionally, or alternatively, a set of components (e.g., one or more components) of immersive application platform 500 may perform one or more functions described as being performed by another set of components of immersive application platform 500.

Figure 6:
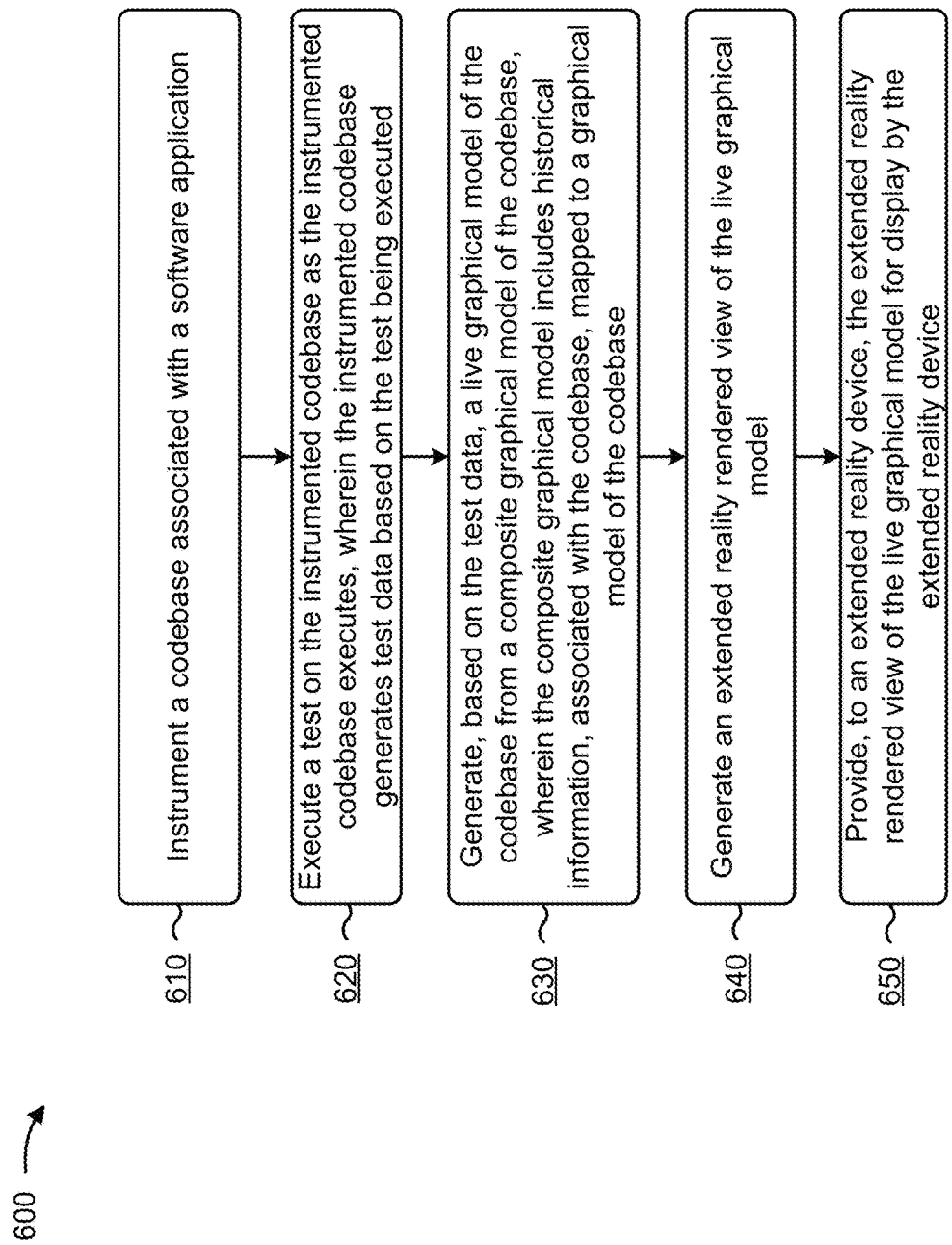
FIG. 6 is a flow chart of an example process for representing a test execution of a software application using extended reality.

FIG. 6 is a flow chart of an example process 600 for representing a test execution of a software application using extended reality. In some implementations, one or more process blocks of FIG. 6 may be performed by an immersive application platform, such as immersive application platform 330, immersive application platform 500, and/or the like. In some implementations, one or more process blocks of FIG. 6 may be performed by another device or a group of devices separate from or including the immersive application platform, such as an extended reality device (e.g., extended reality device 310), a server device (e.g., server device 320), and/or the like.

As shown in FIG. 6, process 600 may include instrumenting a codebase associated with a software application (block 610). For example, the immersive application platform (e.g., using processor 420, memory 430, storage component 440, input component 450, communication interface 470, and/or the like) may instrument a codebase associated with a software application, as described above in connection with FIGS. 1A-1D and/or FIG. 5.

As further shown in FIG. 6, process 600 may include executing a test on the instrumented codebase as the instrumented codebase executes, wherein the instrumented codebase generates test data based on the test being executed (block 620). For example, the immersive application platform (e.g., using processor 420, memory 430, storage component 440, output component 460, communication interface 470, and/or the like) may execute a test on the instrumented codebase as the instrumented codebase executes, as described above in connection with FIGS. 1A-1D and/or FIG. 5. In some implementations, the instrumented codebase may generate test data based on the test being executed.

As further shown in FIG. 6, process 600 may include generating, based on the test data, a live graphical model of the codebase from a composite graphical model of the codebase, wherein the composite graphical model includes historical information, associated with the codebase, mapped to a graphical model of the codebase (block 630). For example, the immersive application platform (e.g., using processor 420, memory 430, storage component 440, output component 460, communication interface 470, and/or the like) may generate, based on the test data, a live graphical model of the codebase from a composite graphical model of the codebase, as described above in connection with FIGS. 1A-1D and/or FIG. 5. In some implementations, the composite graphical model may include historical information, associated with the codebase, mapped to a graphical model of the codebase.

As further shown in FIG. 6, process 600 may include generating an extended reality rendered view of the live graphical model (block 640). For example, the immersive application platform (e.g., using processor 420, memory 430, storage component 440, output component 460, communication interface 470, and/or the like) may generate an extended reality rendered view of the live graphical model, as described above in connection with FIGS. 1A-1D and/or FIG. 5.

As further shown in FIG. 6, process 600 may include providing, to an extended reality device, the extended reality rendered view of the live graphical model for display by the extended reality device (block 650). For example, the immersive application platform (e.g., using processor 420, memory 430, storage component 440, output component 460, communication interface 470, and/or the like) may provide, to an extended reality device, the extended reality rendered view of the live graphical model for display by the extended reality device, as described above in connection with FIGS. 1A-1D and/or FIG. 5.

Process 600 may include additional implementations, such as any single implementation or any combination of implementations described below and/or in connection with one or more other processes described elsewhere herein.

In some implementations, the immersive application platform may perform a static analysis of the codebase to determine a structure of the codebase and one or more metrics associated with the codebase, and may generate the graphical model based on the structure of the codebase and the one or more metrics. In some implementations, the one or more metrics include at least one of coupling between object classes (CBO) associated with a class included in the codebase, a level of abstraction associated with a package included in the codebase, or a class responsibility associated with the class included in the codebase.

In some implementations, when generating the extended reality rendered view of the live graphical model, the immersive application platform may generate the extended reality rendered view of the live graphical model based on information associated with the extended reality device. In some implementations, the historical information may include at least one of historical test data associated with the codebase, or one or more historical outputs, associated with one or more dynamic analysis tools, generated by the codebase.

In some implementations, when instrumenting the codebase, the immersive application platform may identify a join point that identifies an element included in the codebase, and may insert instrumentation code at the identified element. In some implementations, the extended reality rendered view of the live graphical model may include a rendering of a plurality of objects associated with a plurality of elements included in the codebase, and a rendering of a plurality of representations of a plurality of execution traces between the plurality of elements.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
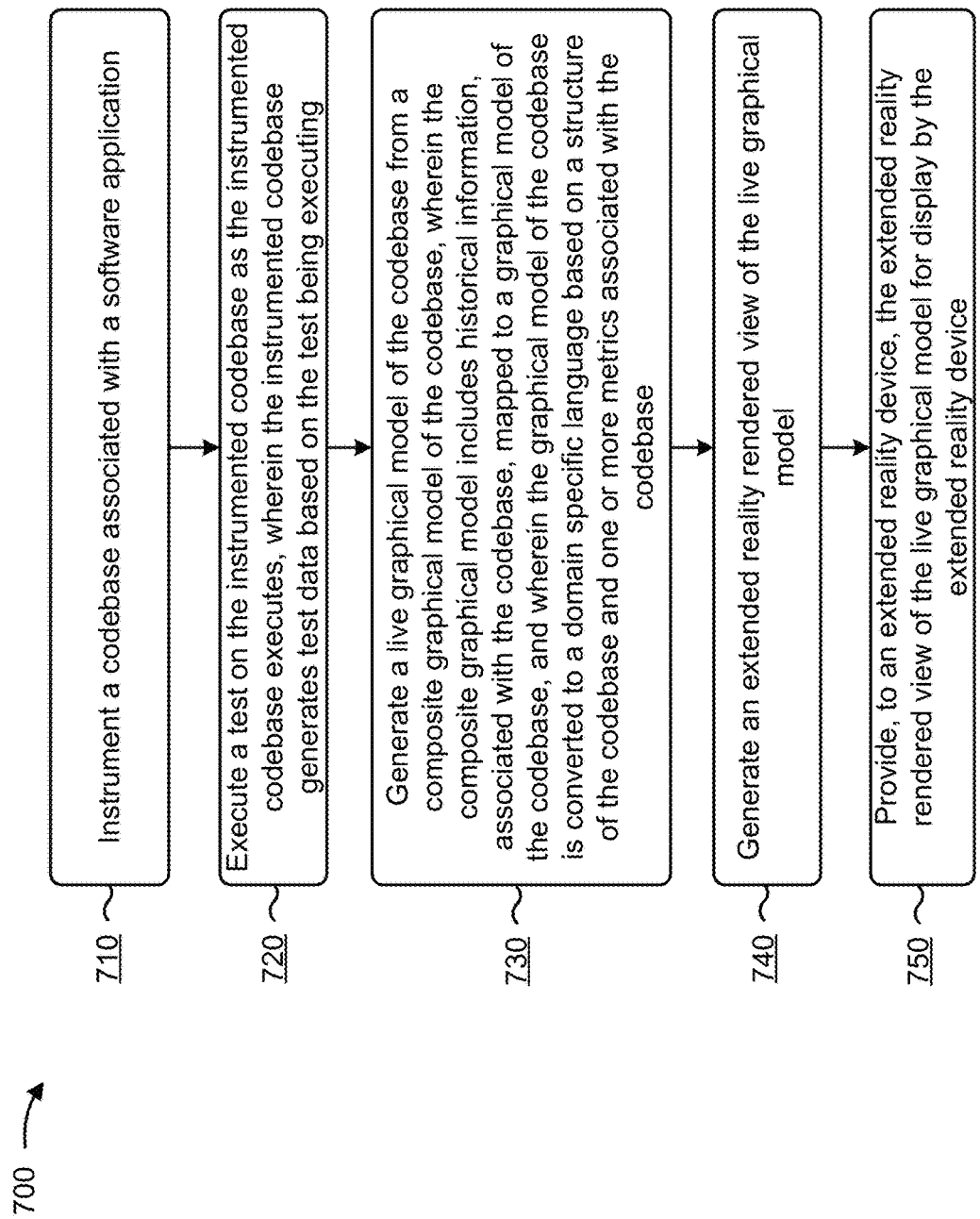
FIG. 7 is a flow chart of an example process for representing a test execution of a software application using extended reality.

FIG. 7 is a flow chart of an example process 700 for representing a test execution of a software application using extended reality. In some implementations, one or more process blocks of FIG. 7 may be performed by an immersive application platform, such as immersive application platform 330, immersive application platform 500, and/or the like. In some implementations, one or more process blocks of FIG. 7 may be performed by another device or a group of devices separate from or including the immersive application platform, such as an extended reality device (e.g., extended reality device 310), a server device (e.g., server device 320), and/or the like.

As shown in FIG. 7, process 700 may include instrumenting a codebase associated with a software application (block 710). For example, the immersive application platform (e.g., using processor 420, memory 430, storage component 440, input component 450, communication interface 470, and/or the like) may instrument a codebase associated with a software application, as described above in connection with FIGS. 1A-1D and/or FIG. 5.

As further shown in FIG. 7, process 700 may include executing a test on the instrumented codebase as the instrumented codebase executes, wherein the instrumented codebase generates test data based on the test being executed (block 720). For example, the immersive application platform (e.g., using processor 420, memory 430, storage component 440, output component 460, communication interface 470, and/or the like) may execute a test on the instrumented codebase as the instrumented codebase executes, as described above in connection with FIGS. 1A-1D and/or FIG. 5. In some implementations, the instrumented codebase may generate test data based on the test being executed.

As further shown in FIG. 7, process 700 may include generating a live graphical model of the codebase from a composite graphical model of the codebase, wherein the composite graphical model includes historical information, associated with the codebase, mapped to a graphical model of the codebase, and wherein the graphical model of the codebase is converted to a domain specific language based on a structure of the codebase and one or more metrics associated with the codebase (block 730). For example, the immersive application platform (e.g., using processor 420, memory 430, storage component 440, output component 460, communication interface 470, and/or the like) may generate a live graphical model of the codebase from a composite graphical model of the codebase, as described above in connection with FIGS. 1A-1D and/or FIG. 5. In some implementations, the composite graphical model may include historical information, associated with the codebase, mapped to a graphical model of the codebase. In some implementations, the graphical model of the codebase may be converted to a domain specific language based on a structure of the codebase and one or more metrics associated with the codebase.

As further shown in FIG. 7, process 700 may include generating an extended reality rendered view of the live graphical model (block 740). For example, the immersive application platform (e.g., using processor 420, memory 430, storage component 440, output component 460, communication interface 470, and/or the like) may generate an extended reality rendered view of the live graphical model, as described above in connection with FIGS. 1A-1D and/or FIG. 5.

As further shown in FIG. 7, process 700 may include providing, to an extended reality device, the extended reality rendered view of the live graphical model for display by the extended reality device (block 750). For example, the immersive application platform (e.g., using processor 420, memory 430, storage component 440, output component 460, communication interface 470, and/or the like) may provide, to an extended reality device, the extended reality rendered view of the live graphical model for display by the extended reality device, as described above in connection with FIGS. 1A-1D and/or FIG. 5.

Process 700 may include additional implementations, such as any single implementation or any combination of implementations described below and/or in connection with one or more other processes described elsewhere herein.

In some implementations, when generating the live graphical model of the codebase from the composite graphical model, the immersive application platform may perform an analysis of the composite graphical model, and may combine results of the analysis with the composite graphical model to generate the live graphical model. In some implementations, the analysis of the composite graphical model may include at least one of a hotspot analysis based on the test data, a dead code analysis based on the test data, an analysis of whether one or more elements, included in the codebase, uses data from an untrusted source, or an analysis of whether the one or more elements, included in the codebase, provides data to the untrusted source.

In some implementations, the extended reality rendered view of the live graphical model may include a visual indicator of at least one of a quantity of times an element, included in the codebase, is executed by the test being executed on the instrumented codebase, an amount of time the element, included in the codebase, takes to execute, or an execution trace between the element and another element that calls the element when the test is executed on the instrumented codebase.

In some implementations, the extended reality rendered view of the live graphical model may include a rendering of a plurality of objects associated with a plurality of elements included in the codebase, wherein the plurality of elements includes a plurality of packages included in the codebase, a plurality of classes included in the plurality of packages, and a plurality of methods included in the plurality of classes.

In some implementations, the immersive application platform may receive an input associated with an interaction with the extended reality rendered view of the live graphical model, and may modify the extended reality rendered view of the live graphical model based on a type of the interaction. In some implementations, the one or more metrics include at least one of a complexity of a method included in the codebase, a class category relational cohesion of a package included in the codebase, or a quantity of parents associated with a class included in the codebase.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
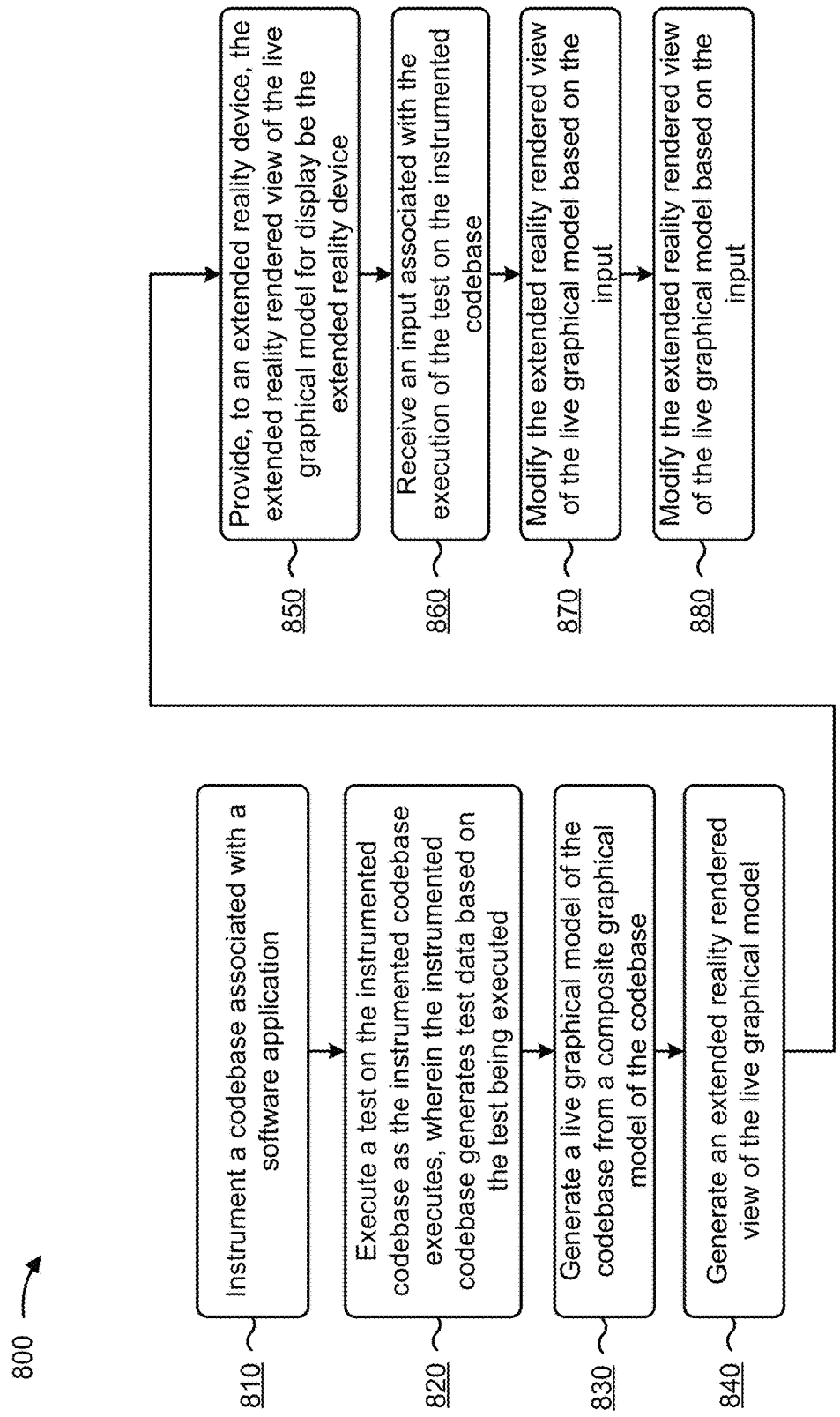
FIG. 8 is a flow chart of an example process for representing a test execution of a software application using extended reality.

FIG. 8 is a flow chart of an example process 800 for representing a test execution of a software application using extended reality. In some implementations, one or more process blocks of FIG. 8 may be performed by an immersive application platform, such as immersive application platform 330, immersive application platform 500, and/or the like. In some implementations, one or more process blocks of FIG. 8 may be performed by another device or a group of devices separate from or including the immersive application platform, such as an extended reality device (e.g., extended reality device 310), a server device (e.g., server device 320), and/or the like.

As shown in FIG. 8, process 800 may include instrumenting a codebase associated with a software application (block 810). For example, the immersive application platform (e.g., using processor 420, memory 430, storage component 440, input component 450, communication interface 470, and/or the like) may instrument a codebase associated with a software application, as described above in connection with FIGS. 1A-1D and/or FIG. 5.

As further shown in FIG. 8, process 800 may include execute a test on the instrumented codebase as the instrumented codebase executes, wherein the instrumented codebase generates test data based on the test being executed (block 820). For example, the immersive application platform (e.g., using processor 420, memory 430, storage component 440, output component 460, communication interface 470, and/or the like) may execute a test on the instrumented codebase as the instrumented codebase executes, as described above in connection with FIGS. 1A-1D and/or FIG. 5. In some implementations, the instrumented codebase may generate test data based on the test being executed.

As further shown in FIG. 8, process 800 may include generating a live graphical model of the codebase from a composite graphical model of the codebase (block 830). For example, the immersive application platform (e.g., using processor 420, memory 430, storage component 440, output component 460, communication interface 470, and/or the like) may generate a live graphical model of the codebase from a composite graphical model of the codebase, as described above in connection with FIGS. 1A-1D and/or FIG. 5.

As further shown in FIG. 8, process 800 may include generating an extended reality rendered view of the live graphical model (block 840). For example, the immersive application platform (e.g., using processor 420, memory 430, storage component 440, output component 460, communication interface 470, and/or the like) may generate an extended reality rendered view of the live graphical model, as described above in connection with FIGS. 1A-1D and/or FIG. 5.

As further shown in FIG. 8, process 800 may include providing, to an extended reality device, the extended reality rendered view of the live graphical model for display be the extended reality device (block 850). For example, the immersive application platform (e.g., using processor 420, memory 430, storage component 440, output component 460, communication interface 470, and/or the like) may provide, to an extended reality device, the extended reality rendered view of the live graphical model for display be the extended reality device, as described above in connection with FIGS. 1A-1D and/or FIG. 5.

As further shown in FIG. 8, process 800 may include receiving an input associated with the execution of the test on the instrumented codebase (block 860). For example, the immersive application platform (e.g., using processor 420, memory 430, storage component 440, output component 460, communication interface 470, and/or the like) may receive an input associated with the execution of the test on the instrumented codebase, as described above in connection with FIGS. 1A-1D and/or FIG. 5.

As further shown in FIG. 8, process 800 may include modifying the extended reality rendered view of the live graphical model based on the input (block 870). For example, the immersive application platform (e.g., using processor 420, memory 430, storage component 440, output component 460, communication interface 470, and/or the like) may modify the extended reality rendered view of the live graphical model based on the input, as described above in connection with FIGS. 1A-1D and/or FIG. 5.

As further shown in FIG. 8, process 800 may include providing, to the extended reality device, the modified extended reality rendered view of the live graphical model for display by the extended reality device (block 880). For example, the immersive application platform (e.g., using processor 420, memory 430, storage component 440, output component 460, communication interface 470, and/or the like) may providing, to the extended reality device, the modified extended reality rendered view of the live graphical model for display by the extended reality device, as described above in connection with FIGS. 1A-1D and/or FIG. 5.

Process 800 may include additional implementations, such as any single implementation or any combination of implementations described below and/or in connection with one or more other processes described elsewhere herein.

In some implementations, the extended reality rendered view of live graphical model may include a rendering of a plurality of objects associated with a plurality of elements included in the codebase, wherein the plurality of elements includes a package included in the codebase, a class included in the package, and a method included in the class, and a rendering of a plurality of representations of a plurality of execution traces between the plurality of elements, wherein the plurality of execution traces comprises a first execution trace between the package and the class, and a second execution trace between the class and the method.

In some implementations, the test data may include at least one of information identifying an execution frequency of a method included in the codebase, information identifying an execution duration of the method, or information identifying an execution trace associated with the method.

In some implementations, when generating the extended reality rendered view of the live graphical model, the immersive application platform may generate the extended reality rendered view of the live graphical model based on information associated with the extended reality device, wherein the information associated with the extended reality device includes at least one of lighting information associated with the extended reality device, spatial information associated with the extended reality device, or information identifying an extended reality device type associated with the extended reality device.

In some implementations, when generating the extended reality rendered view of the live graphical model, the immersive application platform may select a topology that is to be used to display the live graphical model in the extended reality rendered view of the live graphical model, and may select one or more objects that are to be displayed in the topology. In some implementations, when instrumenting the codebase, the immersive application platform may identify a plurality of join points associated with a plurality of locations in the codebase, and may insert instrumentation code at the plurality of locations.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, an immersive application platform (e.g., immersive application platform 330, immersive application platform 500, and/or the like) may enable users of an extended reality device (e.g., extended reality device 310) to comprehend how the software is exercised by the test via a more intuitive medium. In addition, in this way, the immersive application platform may enable users of the extended reality device to automatically visualize dynamic execution traces between one or more elements included in the codebase, hotspots of the codebase, execution times of the one or more elements, dead code included in the codebase, and/or the like, as well as to understand how the aforementioned correlate with other metrics of the codebase. Moreover, in this way, the immersive application platform may provide the user with faster and better understanding of the structure and relationships of the software application, which in turn allows for rapid software application development, debugging, modifications, and/or the like.

Furthermore, implementations described herein use a computerized process to perform tasks that were not previously performed or were previously performed using subjective human intuition or input. For example, prior software application testing approaches include reviewing testing logs after a test is executed, and then if the test fails, attempting to perform a postmortem analysis involving detailed code walkthroughs, which may be textual, non-intuitive and may quickly become directionless if multiple subsystems are involved without the ability to view a holistic view of the software application. Finally, automatically creating the extended reality rendered view of the live graphical model for the extended reality device conserves computing resources (e.g., processors, memory, and/or the like) that would otherwise be wasted in unsuccessfully attempting to comprehend the test results associated with the software application using other techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more memories; and
  one or more processors, communicatively coupled to the one or more memories, to:
    instrument a codebase associated with a software application;
    execute a test on the instrumented codebase as the instrumented codebase executes,
      wherein the instrumented codebase generates test data based on the test being executed;
    perform a static analysis of the codebase to determine a structure of the codebase and one or more metrics associated with the codebase,
      wherein the static analysis includes automatically analyzing the codebase to determine the structure of the codebase;
    generate, based on the structure of the codebase and the one or more metrics, a graphical model;
    generate, based on the test data, a live graphical model of the codebase from a composite graphical model of the codebase,
      wherein the composite graphical model includes historical information, associated with the codebase, mapped to the graphical model;
    generate an extended reality rendered view of the live graphical model,
      wherein the extended reality rendered view is generated based on selecting a topology that is to be used to display the live graphical model; and
    send, to an extended reality device, the extended reality rendered view of the live graphical model for display by the extended reality device.

2. The device of claim 1, wherein the one or more metrics include at least one of:
  coupling between object classes (CBO) associated with a class included in the codebase,
  a level of abstraction associated with a package included in the codebase, or
  a class responsibility associated with the class included in the codebase.

3. The device of claim 1, wherein the one or more processors, when generating the extended reality rendered view of the live graphical model, are to:
  generate the extended reality rendered view of the live graphical model based on information associated with the extended reality device.

4. The device of claim 1, wherein the historical information includes at least one of:
  historical test data associated with the codebase, or
  one or more historical outputs, associated with one or more dynamic analysis tools, generated by the codebase.

5. The device of claim 1, wherein the one or more processors, when instrumenting the codebase, are to:
  identify a join point that identifies an element included in the codebase; and
  insert instrumentation code at the identified element.

6. The device of claim 1, wherein the extended reality rendered view of the live graphical model includes:
  a rendering of a plurality of objects associated with a plurality of elements included in the codebase, and
  a rendering of a plurality of representations of a plurality of execution traces between the plurality of elements.

7. The device of claim 1, wherein the topology that is to be used to display the live graphical model includes one or more of:
  a three-dimensional tree hierarchy,
  a random topology,
  a three-dimensional undirected graph, or
  a three-dimensional directed graph.

8. A method, comprising:
  instrumenting, by a device, a codebase associated with a software application;
  executing, by the device, a test on the instrumented codebase as the instrumented codebase executes,
    wherein the instrumented codebase generates test data based on the test being executed;
  performing, by the device, a static analysis of the codebase to determine a structure of the codebase and one or more metrics associated with the codebase,
    wherein the static analysis includes automatically analyzing the codebase to determine the structure of the codebase;
  generating, by the device and based on the structure of the codebase and the one or more metrics, a graphical model;
  generating, by the device, a live graphical model of the codebase from a composite graphical model of the codebase,
    wherein the composite graphical model includes historical information, associated with the codebase, mapped to the graphical model, and
    wherein the graphical model of the codebase is converted to a domain specific language based on the structure of the codebase and the one or more metrics associated with the codebase;
  generating, by the device, an extended reality rendered view of the live graphical model,
    wherein the extended reality rendered view is generated based on selecting a topology that is to be used to display the live graphical model; and
  sending, by the device and to an extended reality device, the extended reality rendered view of the live graphical model for display by the extended reality device.

9. The method of claim 8, wherein generating the live graphical model of the codebase from the composite graphical model comprises:
  performing an analysis of the composite graphical model; and
  combining results of the analysis with the composite graphical model to generate the live graphical model.

10. The method of claim 9, wherein the analysis of the composite graphical model includes at least one of:
a hotspot analysis based on the test data,
a dead code analysis based on the test data,
an analysis of whether one or more elements, included in the codebase, uses data from an untrusted source, or
an analysis of whether the one or more elements, included in the codebase, provides data to the untrusted source.

11. The method of claim 8, wherein the extended reality rendered view of the live graphical model includes a visual indicator of at least one of:
a quantity of times an element, included in the codebase, is executed by the test being executed on the instrumented codebase,
an amount of time the element, included in the codebase, takes to execute, or
an execution trace between the element and another element that calls the element when the test is executed on the instrumented codebase.

12. The method of claim 8, wherein the extended reality rendered view of the live graphical model comprises:
a rendering of a plurality of objects associated with a plurality of elements included in the codebase,
wherein the plurality of elements comprises:
a plurality of packages included in the codebase,
a plurality of classes included in the plurality of packages, and
a plurality of methods included in the plurality of classes.

13. The method of claim 8, further comprising:
receiving an input associated with an interaction with the extended reality rendered view of the live graphical model; and
modifying the extended reality rendered view of the live graphical model based on a type of the interaction.

14. The method of claim 8, wherein the one or more metrics include at least one of:
a complexity of a method included in the codebase,
a class category relational cohesion of a package included in the codebase, or
a quantity of parents associated with a class included in the codebase.

15. A non-transitory computer-readable medium storing instructions, the instructions comprising:
one or more instructions that, when executed by one or more processors, cause the one or more processors to:
instrument a codebase associated with a software application;
execute a test on the instrumented codebase as the instrumented codebase executes,
wherein the instrumented codebase generates test data based on the test being executed;
perform a static analysis of the codebase to determine a structure of the codebase and one or more metrics associated with the codebase,
wherein the static analysis includes automatically analyzing the codebase to determine the structure of the codebase;
generate, based on the structure of the codebase and the one or more metrics, a graphical model;
generate a live graphical model of the codebase from a composite graphical model of the codebase,
wherein the composite graphical model includes historical information, associated with the codebase, mapped to the graphical model;
generate an extended reality rendered view of the live graphical model,
wherein the extended reality rendered view is generated based on selecting a topology that is to be used to display the live graphical model;
send, to an extended reality device, the extended reality rendered view of the live graphical model for display be the extended reality device;
receive an input associated with the execution of the test on the instrumented codebase;
modify the extended reality rendered view of the live graphical model based on the input; and
send, to the extended reality device, the modified extended reality rendered view of the live graphical model for display by the extended reality device.

16. The non-transitory computer-readable medium of claim 15, wherein the extended reality rendered view of the live graphical model comprises:
a rendering of a plurality of objects associated with a plurality of elements included in the codebase,
wherein the plurality of elements comprises:
a package included in the codebase,
a class included in the package, and
a method included in the class, and
a rendering of a plurality of representations of a plurality of execution traces between the plurality of elements,
wherein the plurality of execution traces comprises:
a first execution trace between the package and the class, and
a second execution trace between the class and the method.

17. The non-transitory computer-readable medium of claim 15, wherein the test data includes at least one of:
information identifying an execution frequency of a method included in the codebase,
information identifying an execution duration of the method, or
information identifying an execution trace associated with the method.

18. The non-transitory computer-readable medium of claim 15, wherein the one or more instructions, that cause the one or more processors to generate the extended reality rendered view of the live graphical model, cause the one or more processors to:
generate the extended reality rendered view of the live graphical model based on information associated with the extended reality device,
wherein the information associated with the extended reality device includes at least one of:
lighting information associated with the extended reality device,
spatial information associated with the extended reality device, or
information identifying an extended reality device type associated with the extended reality device.

19. The non-transitory computer-readable medium of claim 15, wherein the one or more instructions, that cause the one or more processors to select the topology that is to be used to display the live graphical model, causes the one or more processors to:
select one or more objects that are to be displayed in the topology.

20. The non-transitory computer-readable medium of claim 15, when the one or more instructions, that cause the one or more processors to instrument the codebase, cause the one or more processors to:
    identify a plurality of join points associated with a plurality of locations in the codebase; and
    insert instrumentation code at the plurality of locations.

* * * * *